United States Patent
Nakamura et al.

(10) Patent No.: US 10,679,677 B2
(45) Date of Patent: Jun. 9, 2020

(54) INFORMATION PROCESSING DEVICE AND INFORMATION PROCESSING METHOD

(71) Applicant: SONY CORPORATION, Tokyo (JP)

(72) Inventors: Kazuki Nakamura, Tokyo (JP);
Chikako Tateishi, Kanagawa (JP);
Morio Omata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/087,216

(22) PCT Filed: Mar. 2, 2017

(86) PCT No.: PCT/JP2017/008382
§ 371 (c)(1),
(2) Date: Sep. 21, 2018

(87) PCT Pub. No.: WO2017/169502
PCT Pub. Date: Oct. 5, 2017

(65) Prior Publication Data
US 2019/0122702 A1    Apr. 25, 2019

(30) Foreign Application Priority Data
Mar. 31, 2016  (JP) ................. 2016-070592

(51) Int. Cl.
*H04N 9/80*       (2006.01)
*G11B 27/34*      (2006.01)
*G03B 17/18*      (2006.01)
*H04N 5/91*       (2006.01)
*G06F 3/0481*     (2013.01)
(Continued)

(52) U.S. Cl.
CPC .............. *G11B 27/34* (2013.01); *G03B 17/18* (2013.01); *G06F 3/0481* (2013.01); *G06T 11/001* (2013.01); *H04N 5/23293* (2013.01); *H04N 5/91* (2013.01)

(58) Field of Classification Search
USPC ................................................. 386/240–248
See application file for complete search history.

(56) References Cited

U.S. PATENT DOCUMENTS 9,529,509 B1 *  12/2016  Schmidt .............. G06F 3/04842
9,773,350 B1 *  9/2017  Crosby .................. H04N 5/247
9,881,560 B2 *  1/2018  Kato .................... G09G 3/3406
(Continued)

FOREIGN PATENT DOCUMENTS

EP   2330498 A    6/2011
JP   2008-263457 A   10/2008
(Continued)

OTHER PUBLICATIONS

International Search Report and Written Opinion of PCT Application No. PCT/JP2017/008382, dated Apr. 25, 2017, 10 pages of ISRWO.

*Primary Examiner* — Nigar Chowdhury
(74) *Attorney, Agent, or Firm* — Chip Law Group

(57) ABSTRACT

Provided is an information processing device that includes a control unit that determines a visual effect to a screen on which representative information of content is displayed. The visual effect is determined based on detection information detected at time of generating the content. The control unit and displays the determined visual effect along with the representative information on the screen.

20 Claims, 29 Drawing Sheets

| | LARGE VALUE | SMALL VALUE | OTHER THAN SCALE/OTHERS |
|---|---|---|---|
| MOVING THING OR STILL THING | • IN CASE OF MOVING THING: MOTION AT PERIPHERY OF THUMBNAIL IS LARGE | • IN CASE OF BEING STILL, OR HAVING SMALL AMOUNT OF MOTION: MOTION IS SLOW | • DIVIDE CATEGORY FOR EASY VIEW OF SUBSTANCE  PET  PLANT |
| LANDSCAPE OR MACRO | • DISTANT (LANDSCAPE): NUMBER OF COLORS AT PERIPHERY OF THUMBNAIL IS LARGE | • NEAR (MACRO): SMALL | |
| BLURRING DEGREE | • BLUR AT PERIPHERY OF THUMBNAIL IS STRONG | • WEAK | |

(51) Int. Cl.
*H04N 5/232* (2006.01)
*G06T 11/00* (2006.01)

(56) References Cited

U.S. PATENT DOCUMENTS

| | | | | |
|---|---|---|---|---|
| 2006/0204050 | A1* | 9/2006 | Takizawa | G06K 9/00288 |
| | | | | 382/115 |
| 2007/0120793 | A1* | 5/2007 | Kimura | G09G 3/3648 |
| | | | | 345/89 |
| 2008/0297622 | A1* | 12/2008 | Miyashita | H04N 5/23293 |
| | | | | 348/229.1 |
| 2009/0103888 | A1* | 4/2009 | Murabayashi | G06F 16/786 |
| | | | | 386/248 |
| 2009/0262218 | A1* | 10/2009 | Makii | G03B 15/08 |
| | | | | 348/239 |
| 2009/0287996 | A1* | 11/2009 | Norimatsu | G06T 11/00 |
| | | | | 715/243 |
| 2010/0277491 | A1* | 11/2010 | Hiratsuka | H04N 1/00161 |
| | | | | 345/581 |
| 2010/0277496 | A1 | 11/2010 | Kawanishi et al. | |
| 2011/0041086 | A1* | 2/2011 | Kim | G06F 3/0488 |
| | | | | 715/764 |
| 2011/0258540 | A1* | 10/2011 | Ueda | G06F 16/168 |
| | | | | 715/273 |
| 2012/0143359 | A1* | 6/2012 | Pham | H04N 21/482 |
| | | | | 700/94 |
| 2012/0307096 | A1* | 12/2012 | Ford | H04N 5/23219 |
| | | | | 348/222.1 |
| 2013/0063614 | A1* | 3/2013 | Tsutsumi | H04N 5/2258 |
| | | | | 348/208.4 |
| 2013/0191783 | A1 | 7/2013 | Sugita et al. | |
| 2013/0311885 | A1* | 11/2013 | Wang | G06F 3/04845 |
| | | | | 715/719 |
| 2014/0022282 | A1* | 1/2014 | Inoue | G09G 5/377 |
| | | | | 345/633 |
| 2014/0164966 | A1* | 6/2014 | Kim | G06F 3/04886 |
| | | | | 715/769 |
| 2014/0357435 | A1* | 12/2014 | Lundberg | F16H 61/66272 |
| | | | | 474/30 |
| 2015/0128035 | A1* | 5/2015 | Takae | G06F 3/016 |
| | | | | 715/702 |
| 2015/0147048 | A1* | 5/2015 | Kim | H04N 21/4852 |
| | | | | 386/282 |
| 2015/0294687 | A1* | 10/2015 | Buick | G11B 27/036 |
| | | | | 386/280 |
| 2016/0219217 | A1* | 7/2016 | Williams | H04N 5/23293 |
| 2016/0316172 | A1* | 10/2016 | Jaynes | H04L 65/4092 |
| 2017/0034449 | A1* | 2/2017 | Eum | H04N 5/2258 |
| 2019/0297239 | A1* | 9/2019 | Richarte | G03B 15/006 |

FOREIGN PATENT DOCUMENTS

| | | |
|---|---|---|
| JP | 2009-100314 A | 5/2009 |
| JP | 2009-188899 A | 8/2009 |
| JP | 2010-026975 A | 2/2010 |
| JP | 2011-119832 A | 6/2011 |
| JP | 2013-149160 A | 8/2013 |
| JP | 5346941 B2 | 11/2013 |
| WO | 2010/032402 A1 | 3/2010 |

* cited by examiner

FIG. 13
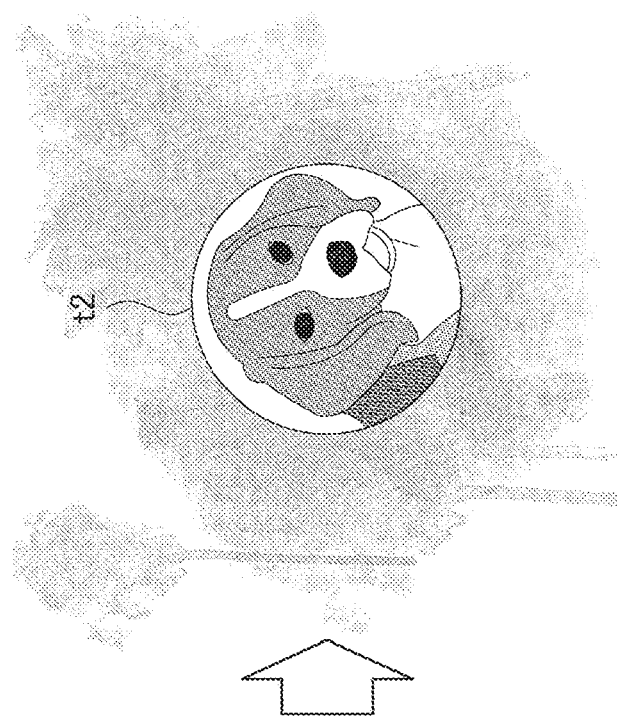
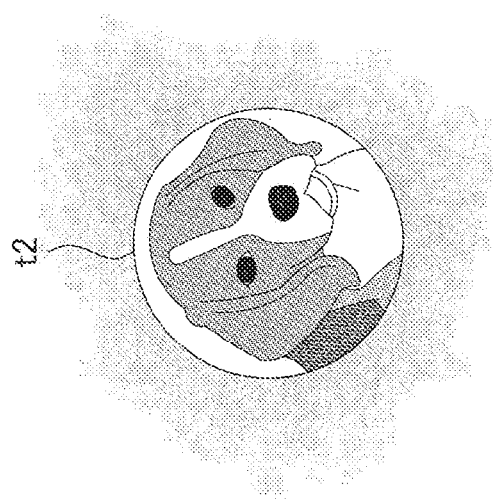

FIG. 15A

| | LARGE VALUE | SMALL VALUE | OTHER THAN SCALE/OTHERS |
|---|---|---|---|
| SPEED OF SUBJECT | 1. BLURRING SPEED IS HIGH<br>2. NUMBER OF PREVIEW SWITCHING TIMES IS LARGE, AND TIME IS SHORT (SET TIME WHEN SPEED BECOMES HIGH TO SWITCHING POINT) 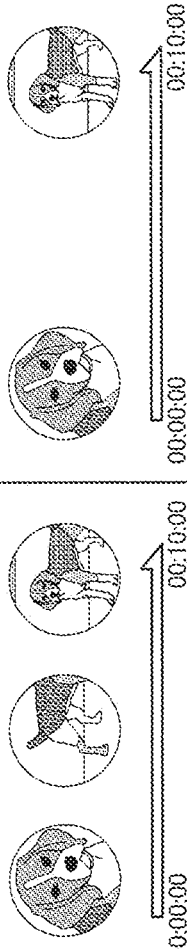 | 1. BLURRING SPEED IS LOW<br>2. NUMBER OF PREVIEW SWITCHING TIMES IS SMALL, AND TIME IS LONG 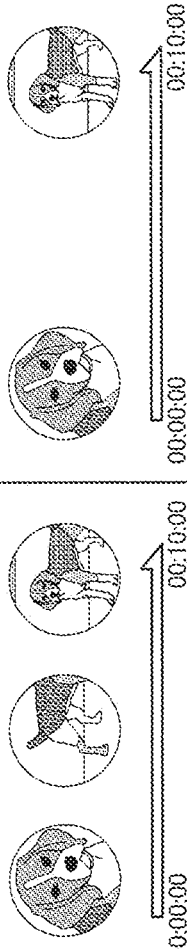 | |
| AREA | • SPREAD AT PERIPHERY OF THUMBNAIL IS WIDE (ANIMATION THAT SLOWLY SPREADS FROM INSIDE)  | • NARROW 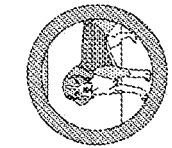 | • SCALE OF THUMBNAIL SIZE   |

FIG. 15B

| | LARGE VALUE | SMALL VALUE | OTHER THAN SCALE/OTHERS |
|---|---|---|---|
| MOVING THING OR STILL THING | • IN CASE OF MOVING THING: MOTION AT PERIPHERY OF THUMBNAIL IS LARGE | • IN CASE OF BEING STILL, OR HAVING SMALL AMOUNT OF MOTION: MOTION IS SLOW | • DIVIDE CATEGORY FOR EASY VIEW OF SUBSTANCE |
| LANDSCAPE OR MACRO | • DISTANT (LANDSCAPE): NUMBER OF COLORS AT PERIPHERY OF THUMBNAIL IS LARGE | • NEAR (MACRO): SMALL | |
| BLURRING DEGREE | • BLUR AT PERIPHERY OF THUMBNAIL IS STRONG | • WEAK | |

FIG. 16A

| | LARGE VALUE | SMALL VALUE | OTHER THAN SCALE/OTHERS |
|---|---|---|---|
| WEATHER | • IN CASE OF GOOD WEATHER: COLORING RED | • IN CASE OF BAD WEATHER: GRAY TO BLUE | CHANGE ANIMATION FOR EACH WEATHER<br>FINE  RAIN  SNOW |
| HUMIDITY | 1. BLURRING SPEED IS HIGH<br>2. COLOR AT PERIPHERY OF THUMBNAIL IS BRIGHT<br>3. COLOR AT PERIPHERY OF THUMBNAIL IS THICK | 1. SLOW<br>2. DARK<br>3. THIN | |
| TEMPERATURE | 1. COLORING: RED<br>2. ANIMATION OF FIRE SURROUNDING THUMBNAIL.<br>RANGE IS WIDER AS TEMPERATURE IS HIGHER | 1. COLORING: BLUE<br>2. ANIMATION OF ICE: RANGE IS WIDER AS LOWER | |

FIG. 16B

| | LARGE VALUE | SMALL VALUE |
|---|---|---|
| SOUND | • EFFECT LIKE EQUALIZER: NUMBER OF BARS AT PERIPHERY IS INCREASED AND MOTION IS LARGE | • NUMBER OF BARS IS SMALL AND MOTION IS SMALL |
| AMOUNT OF WIND | • EFFECT LIKE SMOKE: AMOUNT IS LARGE AND FLOW IS FAST | • AMOUNT IS SMALL AND NO FLOW |

FIG. 17

| | LARGE VALUE | SMALL VALUE | OTHER THAN SCALE/OTHERS |
|---|---|---|---|
| BRIGHTNESS | 1. WIDTH OF LUSTER IS WIDE<br>2. COLOR IS BRIGHT | 1. NARROW<br>2. DARK | |
| TIME | • DURATION OF IMAGING TIME: BLURRING IS SLOW | • FAST | • IMAGING TIME: DISPLAY TIME COLORING |
| POSITION INFORMATION | HEIGHT OF THE PLACE: HIGH INCREASE SEQUENCE | LOW: REDUCE | • ARRANGE LIKE MAP |

FIG. 18

| | LARGE VALUE | SMALL VALUE |
|---|---|---|
| MOVEMENT OF GAZE/CAMERA LENS | 1. BLURRING SPEED IS HIGH<br>2. NUMBER OF PREVIEW SWITCHING TIMES IS LARGE<br>(SET MOVING TIME TO SWITCHING POINT)<br><br>00:00:00　　　　　　00:10:00 | 1. BLURRING SPEED IS LOW<br>2. NUMBER OF PREVIEW SWITCHING TIMES IS SMALL<br><br>00:00:00　　　　　　00:10:00 |
| BIOLOGICAL SIGNAL | • AMOUNT OF SWEATING IS LARGE<br>PARTICLE EXPRESSION: LARGE<br><br>• NUMBER OF HEART BEATING: PULSING IS FAST<br>EXPRESSION LIKE PULSING AT PERIPHERY OF THUMBNAIL: FAST<br><br>• EMOTION: EXCITING STATE<br>MOTION LIKE PULSING, NOTCHED EFFECT IS HIGH | • AMOUNT OF SWEAT IS SMALL<br>PARTICLE EXPRESSION: SMALL<br><br>• PULSING IS SLOW<br>SLOW, SMALL<br><br><br>• MOTION LIKE PULSING, NOTCHED EFFECT IS WEAK |
| DISTANCE BETWEEN CAMERA AND IMAGING PERSON | • INTEREST DEGREE AND CONCENTRATION DEGREE ARE STRONG; BLURRING SPEED IS LOW | • CONCENTRATION DEGREE IS WEAK; BLURRING SPEED IS HIGH |

FIG. 19
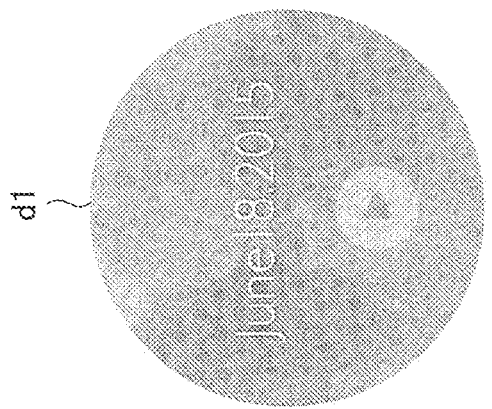
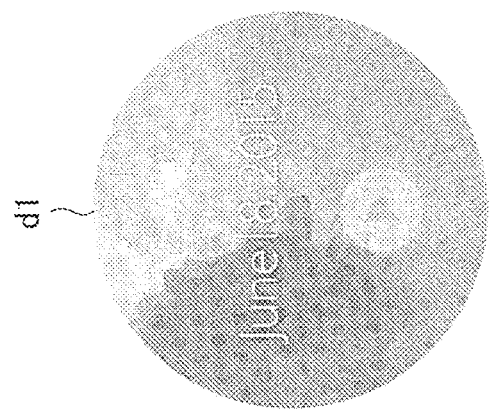
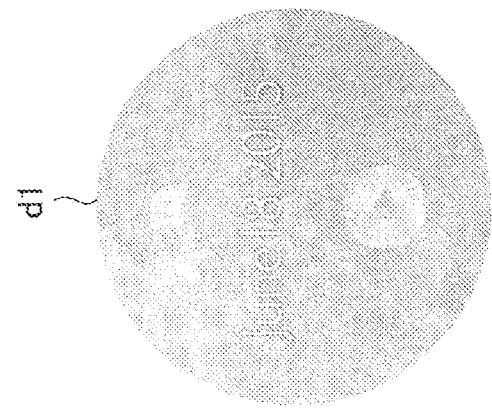

FIG. 21
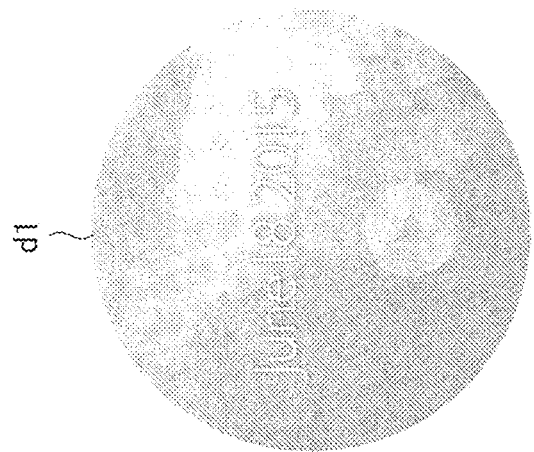
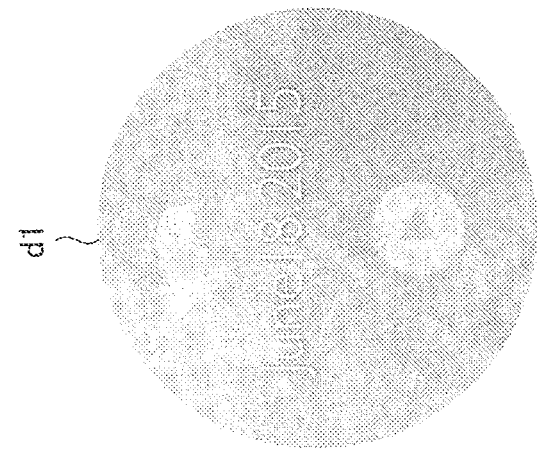

FIG. 22
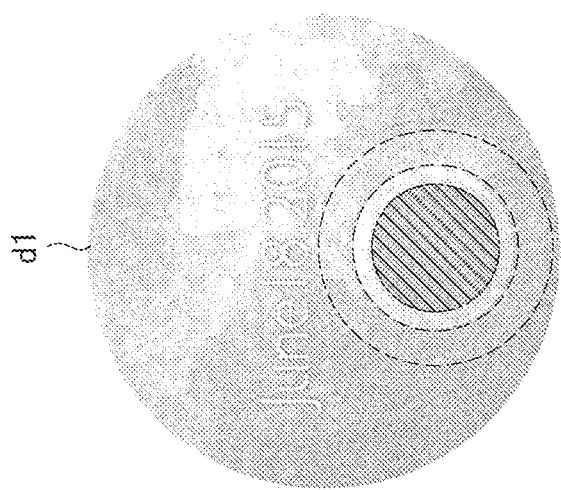
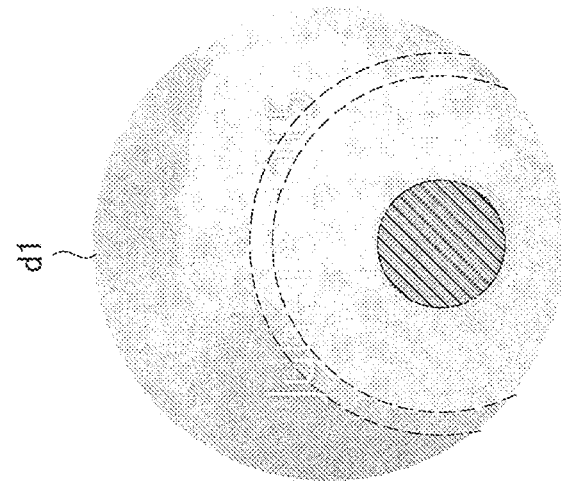

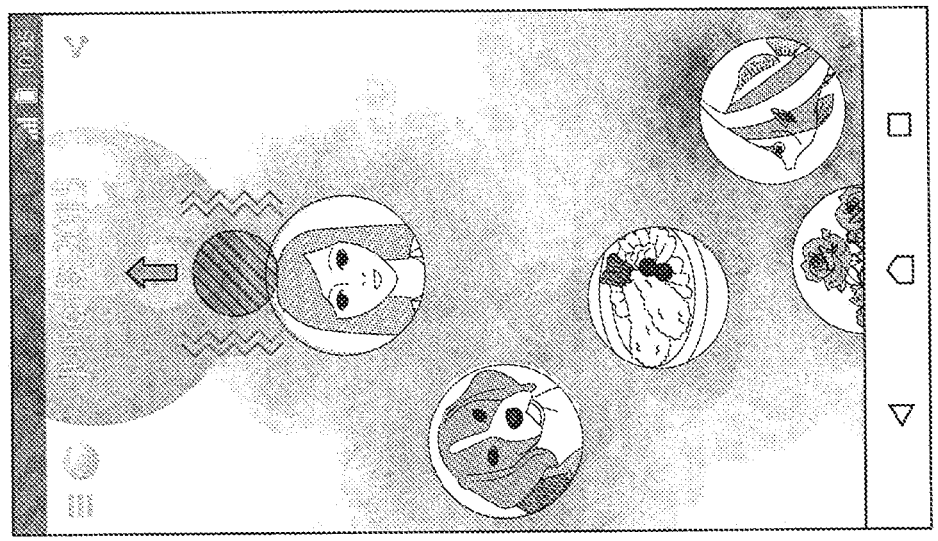
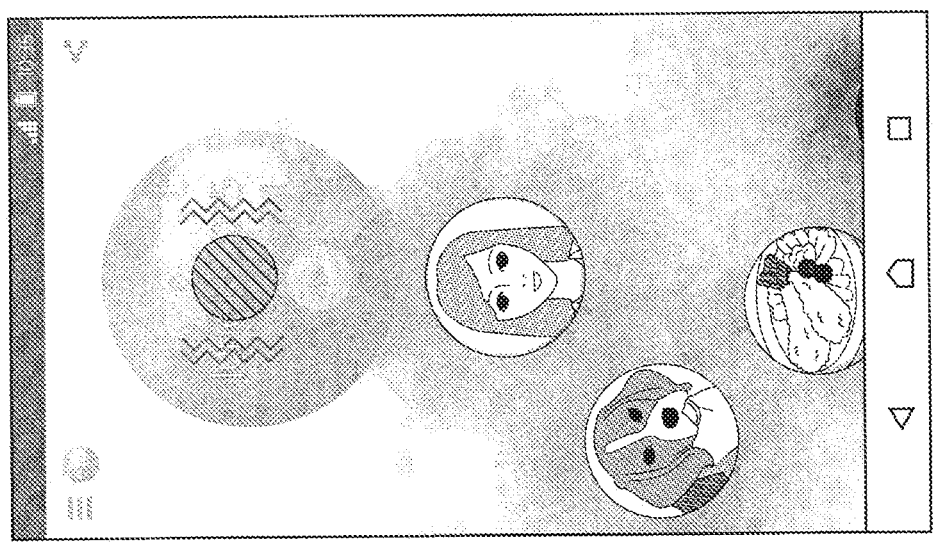
FIG. 23

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/008382 filed on Mar. 2, 2017, which claims priority benefit of Japanese Patent Application No. JP 2016-070592 filed in the Japan Patent Office on Mar. 31, 2016. Each of the above-referenced applications is hereby incorporated herein by reference in its entirety.

TECHNICAL FIELD

The present disclosure relates to an information processing device, an information processing method, and a computer program.

BACKGROUND ART

For example, Patent Literature 1 discloses a technology of an information presenting device, an information presenting method, and a computer program for presenting, to a user, content or a file of a still image or a moving image captured by a digital camera depending on a file updating date and time such as an imaging day.

CITATION LIST

Patent Literature

Patent Literature 1: JP 2008-263457A

DISCLOSURE OF INVENTION

Technical Problem

However, it is not possible to know before reproduction, only by viewing a thumbnail of content or a folder to which the content is stored, which atmosphere the content or the content stored in the folder has.

Accordingly, according to the present disclosure, novel and improved information processing device, information processing method, and computer program are presented to enable presentation about which atmosphere content has before reproduction.

Solution to Problem

According to the present disclosure, there is provided an information processing device including: a control unit that determines a visual effect to a screen on which representative information of content is displayed, on a basis of detection information detected at time of generating the content, and allows the determined visual effect to be displayed with the representative information on the screen.

In addition, according to the present disclosure, there is provided an information processing method including: determining a visual effect to a screen on which representative information of content is displayed, on a basis of detection information that is detected at time of generating the content; and allowing the determined visual effect to be displayed with the representative information on the screen.

In addition, according to the present disclosure, there is provided a computer program allowing a computer system to execute: determining a visual effect to a screen on which representative information of content is displayed, on a basis of detection information that is detected at time of generating the content; and allowing the determined visual effect to be displayed with the representative information on the screen.

Advantageous Effects of Invention

According to the present disclosure, as mentioned above, novel and improved information processing device, information processing method, and computer program can be provided to enable presentation about which atmosphere content has before reproduction.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is an explanatory diagram illustrating an example of the screen displayed on the display unit 210 by the mobile terminal 200.

FIG. 15A is an explanatory diagram illustrating an example of changing a visual effect added to a thumbnail or a folder by the mobile terminal 200 depending on a situation of an imaging target of a moving image.

FIG. 15B is an explanatory diagram illustrating an example of changing a visual effect added to a thumbnail or a folder by the mobile terminal 200 depending on a situation of an imaging target of a moving image.

FIG. 16A is an explanatory diagram illustrating an example of changing the visual effect added to the thumbnail or folder by the mobile terminal 200 depending on the situation of imaging environment of the moving image.

FIG. 16B is an explanatory diagram illustrating an example of changing the visual effect added to the thumbnail or folder by the mobile terminal 200 depending on the situation of imaging environment of the moving image.

FIG. 17 is an explanatory diagram illustrating an example of changing the visual effect added to the thumbnail or folder by the mobile terminal 200 depending on the situation of imaging environment of the moving image.

FIG. 18 is an explanatory diagram illustrating an example of changing the visual effect added to the thumbnail or folder by the mobile terminal 200 depending on the situation of the imaging person of the moving image at the imaging time.

FIG. 19 is an explanatory diagram illustrating an example of the screen displayed on the display unit 210 by the mobile terminal 200.

FIG. 21 is an explanatory diagram illustrating an example of the screen displayed on the display unit 210 by the mobile terminal 200.

FIG. 22 is an explanatory diagram illustrating an example of the screen displayed on the display unit 210 by the mobile terminal 200.

FIG. 23 is an explanatory diagram illustrating an example of the screen displayed on the display unit 210 by the mobile terminal 200.

MODE(S) FOR CARRYING OUT THE INVENTION

Figure 1:
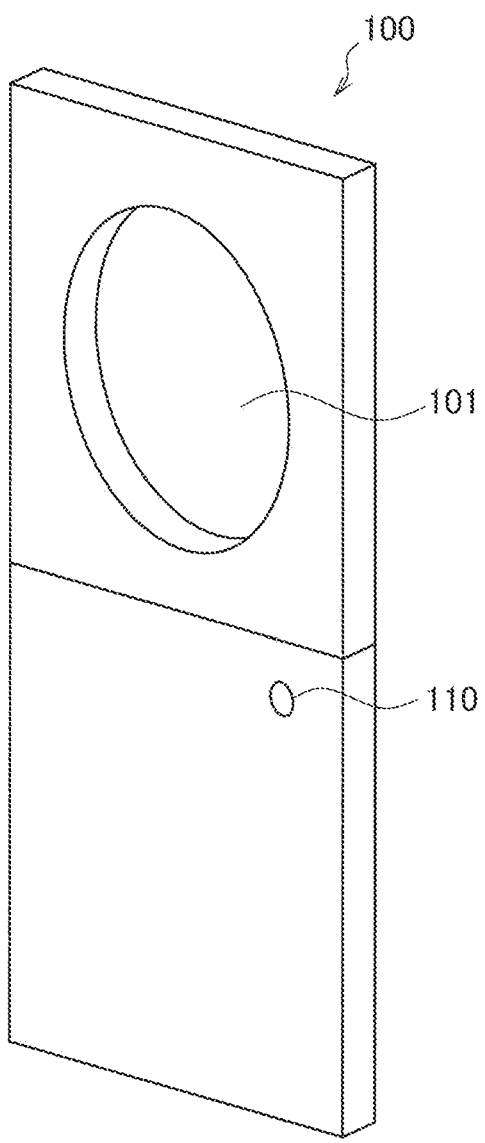
FIG. 1 is an explanatory diagram illustrating an appearance example of an imaging device 100 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It is noted that the explanation is given in the following order.

1. First embodiment (capturing control: example of using two-axis gyro sensor)
 1.1. Appearance example of imaging device
 1.2. Use example of imaging device
 1.3. Functional configuration example of imaging device
 1.4. Functional configuration example of mobile terminal
 1.5. Operational example of mobile terminal
2. Conclusion 1. Embodiment According to the Present Disclosure

[1.1. Appearance Example of Imaging Device]

Figure 2:
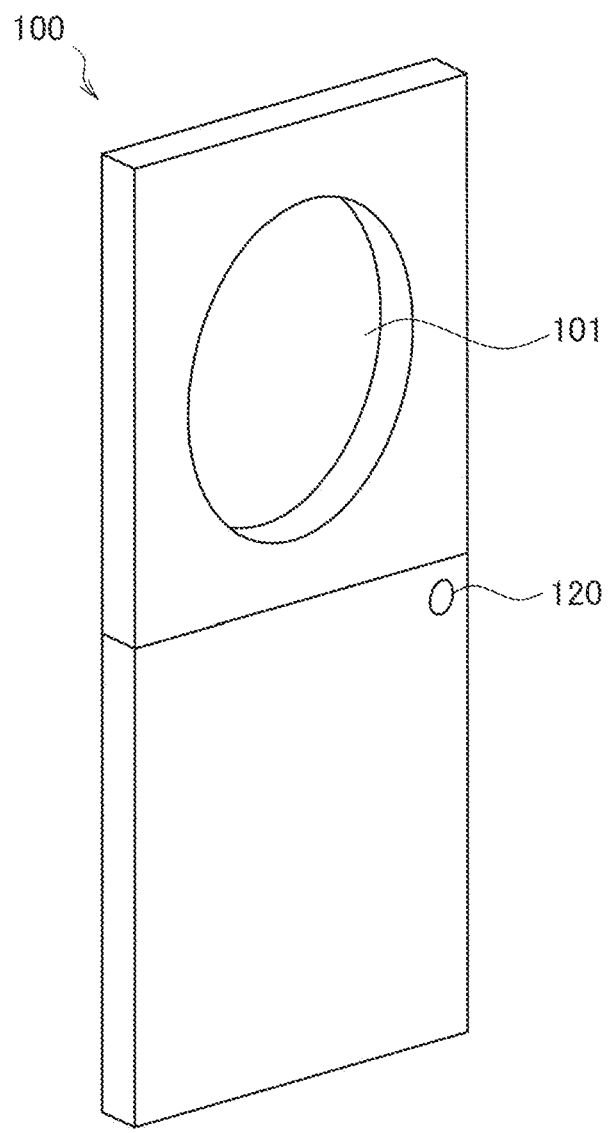
FIG. 2 is an explanatory diagram illustrating an appearance example of the imaging device 100 according to the embodiment.

First, a description will be given of an appearance example of an imaging device according to an embodiment of the present disclosure. FIGS. 1 and 2 are explanatory diagrams illustrating appearance examples of an imaging device 100 according to the embodiment of the present disclosure.

FIG. 1 is a front perspective view of the imaging device 100 according to the embodiment of the present disclosure. Further, FIG. 2 is a rear perspective view of the imaging device 100 according to the embodiment of the present disclosure. The imaging device 100 includes an imaging unit 110 that captures an image (still image or moving image) as an example of content of the present disclosure on the front side, and also includes an eye touch detecting unit 120 that detects a fact that an imaging person peers into a hole 101 on the rear side.

The eye touch detecting unit 120 includes, e.g., a camera, an infrared sensor, or the like. In a case where a camera is used as the eye touch detecting unit 120, the eye touch detecting unit 120 can detect not only eye touch to the hole 101 of the imaging person but also an operation of an eyeball in a case where the imaging person touches the eye to the hole 101. Although not shown in FIGS. 1 and 2, the imaging device 100 may have a microphone for collecting sound at the same time of an imaging time of a moving image with the imaging unit 110.

The imaging device 100 may include therein at least one of various sensors such as a position measurement sensor, an acceleration sensor, a gyroscope sensor, a geomagnetic sensor, an illuminance sensor, a temperature sensor, a barometric air pressure sensor, and a heartbeat sensor. It is noted that as the above-mentioned position measurement sensor, specifically, e.g., a global navigation satellite system (GNSS) receiver and/or a communication device can be included. The GNSS can include, e.g., a global positioning system (GPS), a global navigation satellite system (GLONASS), a BeiDou navigation satellite system (BDS), a quasi-zenith satellites system (QZSS), a Galileo, or the like. Further, the position measurement sensor can include, e.g., a device for detecting a position using a technology such as wireless LAN, multi-input multi-output (MIMO), cellar communication (e.g., position detection using a mobile base station and a femtocell), or near field wireless communication (e.g., Bluetooth low energy (BLE), Bluetooth (registered trademark)).

It is noted that above-mentioned various sensors may not be provided to the imaging device 100. That is, the above-mentioned various sensors may be attached to the body of the imaging person who captures an image by using the imaging device 100.

Obviously, the imaging device 100 illustrated in FIGS. 1 and 2 is an example of the present disclosure, and the structure of the imaging device is not limited to the example. As long as the device can detect the touch to the eye of the imaging person and start the imaging, the hole 101 illustrated in FIGS. 1 and 2 may not be provided to the imaging device.

[1.2. Use Example of Imaging Device]

Figure 3:
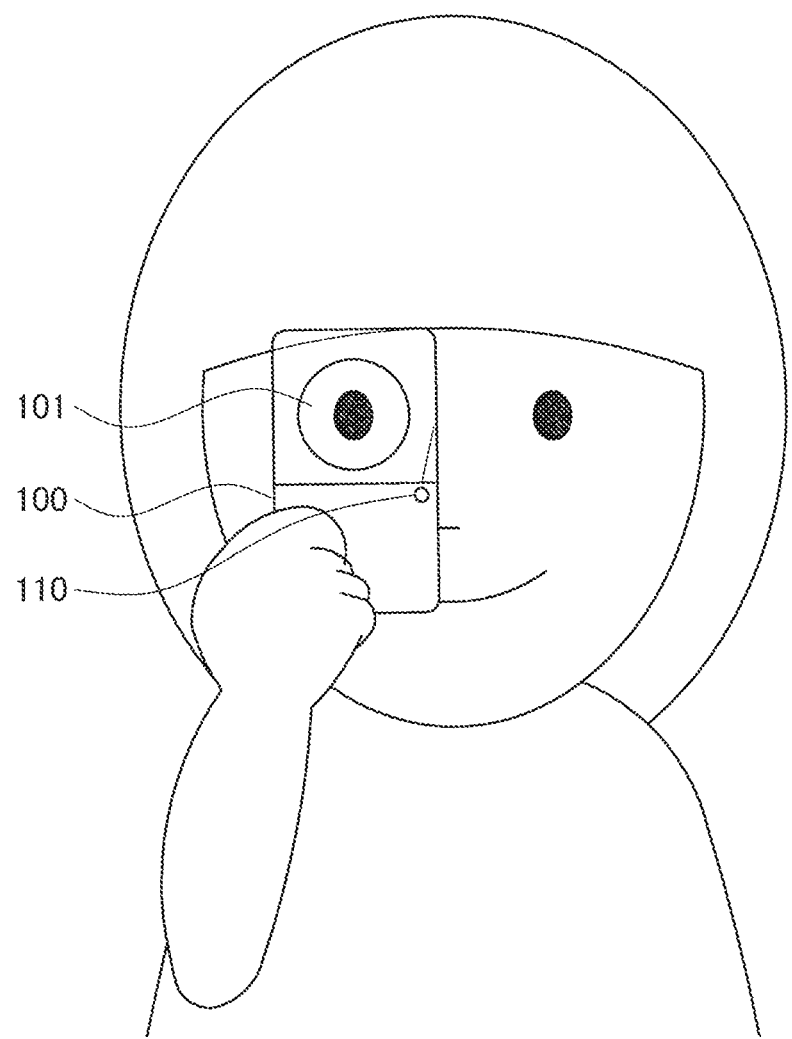
FIG. 3 is an explanatory diagram illustrating a use example of the imaging device 100 according to the embodiment.
Figure 4:
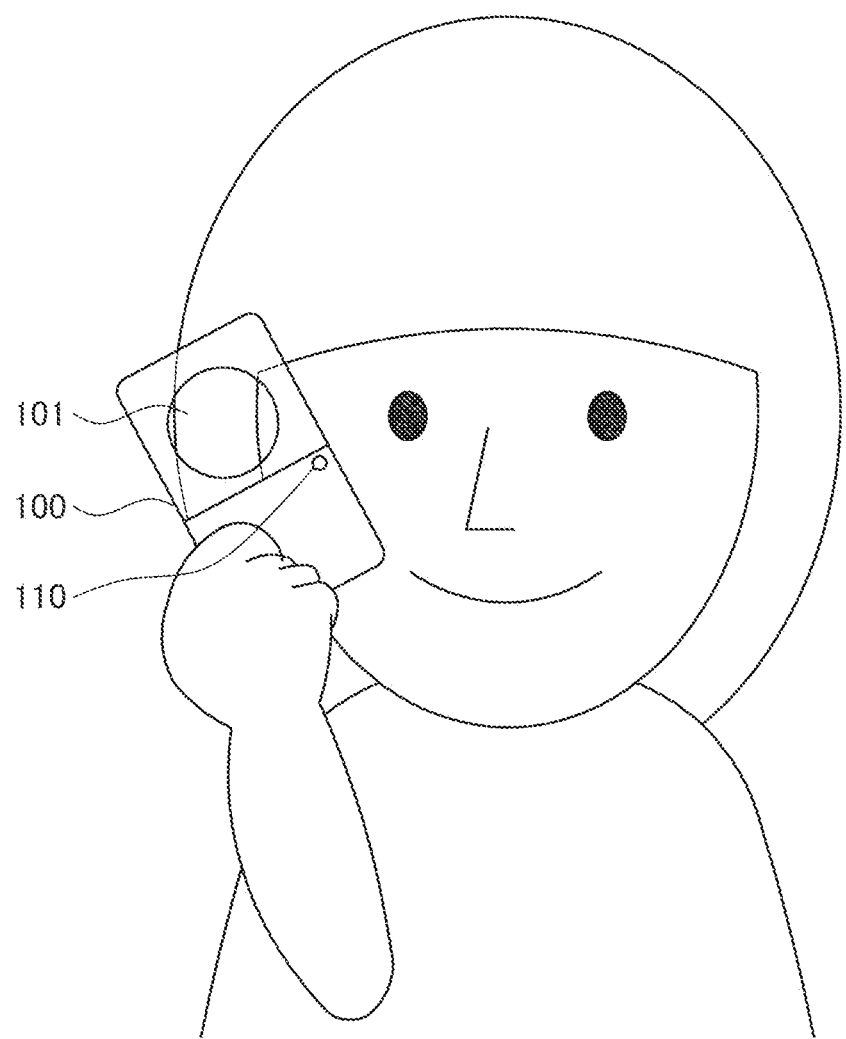
FIG. 4 is an explanatory diagram illustrating a use example of the imaging device 100 according to the embodiment.

Subsequently, a description will be given of a use example of the imaging device according to the embodiment of the present disclosure. FIGS. 3 and 4 are explanatory diagrams illustrating use examples of the imaging device 100 according to the embodiment of the present disclosure.

As illustrated in FIG. 3, the imaging device 100 according to the embodiment starts the imaging of a moving image with the imaging unit 110 in a case where the imaging person peers into the hole 101. Further, as illustrated in FIG. 4, the imaging device 100 according to the embodiment starts the imaging of the moving image with the imaging unit 110 in a case where the imaging person detaches the eye from the hole 101.

The eye touch detecting unit 120 detects whether or not the imaging person peers into the hole 101. In a case where the eye touch detecting unit 120 detects that the imaging person peers into the hole 101, the imaging device 100 starts the imaging of the moving image with the imaging unit 110. Further, in a case where the eye touch detecting unit 120 detects that the imaging person does not peer into the hole 101, the imaging device 100 ends the imaging of the moving image with the imaging unit 110.

The imaging device 100 stores therein the moving image captured for a period from the start of imaging to the end. The imaging device 100 may store data including sound collected during the period in a case of storing the moving image. Further, the imaging device 100 may store sensing data obtained by the sensor during the period or an eye touch state of the imaging person with the eye touch detecting unit 120 in the case of storing the moving image.

The imaging device 100 has a configuration that enables transfer of the stored moving image to another device, e.g., a personal computer, a smartphone, and a tablet terminal. The imaging device 100 may transfer the stored moving image to another device by using, e.g., near field communication (NFC).

Figure 5:
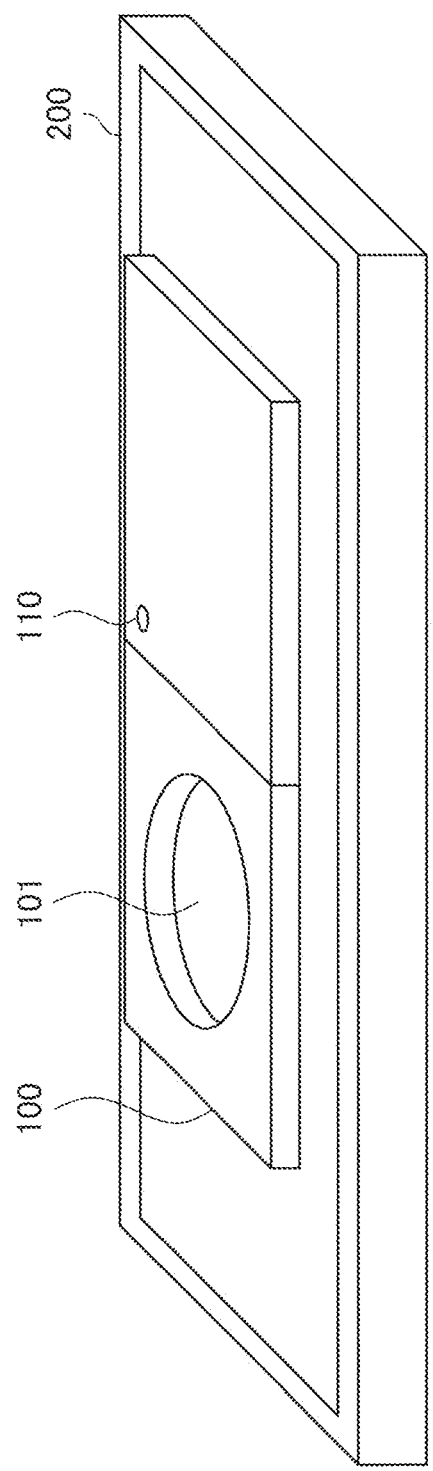
FIG. 5 is an explanatory diagram illustrating a state of transferring a moving image stored by the imaging device 100 to a mobile terminal 200.

FIG. 5 is an explanatory diagram illustrating a state that the moving image stored by the imaging device 100 is transferred to the mobile terminal 200. FIG. 5 illustrates an example of a state that the moving image stored by the imaging device 100 is transferred to the mobile terminal 200 with the NFC. As illustrated in FIG. 5, the imaging device 100 can be near the mobile terminal 200 and transfer the stored moving image to the mobile terminal 200 with the NFC.

Obviously, communication between the imaging device 100 and the mobile terminal 200 is not limited to the NFC. Wireless communication using 2.4 GHz band based on, e.g., IEEE 802.15.1 standard may be used for the communication between the imaging device 100 and the mobile terminal 200, wireless communication using 2.4 GHz band or 5 GHz band via an access point of the wireless LAN may be used, or wired communication using a universal serial bus (USB) may be used.

It is noted that the imaging device 100 may transfer sensing data obtained by the sensor that is provided for the imaging device 100 for a period from the start of the imaging of the moving image to the end or is attached to the imaging person, or an eye touch state of the imaging person with the eye touch detecting unit 120, in a case where the moving image is transferred to the mobile terminal 200. The mobile terminal 200 obtains the sensing data and the eye touch state of the imaging person with the eye touch detecting unit 120 in addition to the moving image from the imaging device 100, thereby enabling setting of an effect on the obtained moving image by using the sensing data or the eye touch state.

Figure 6:
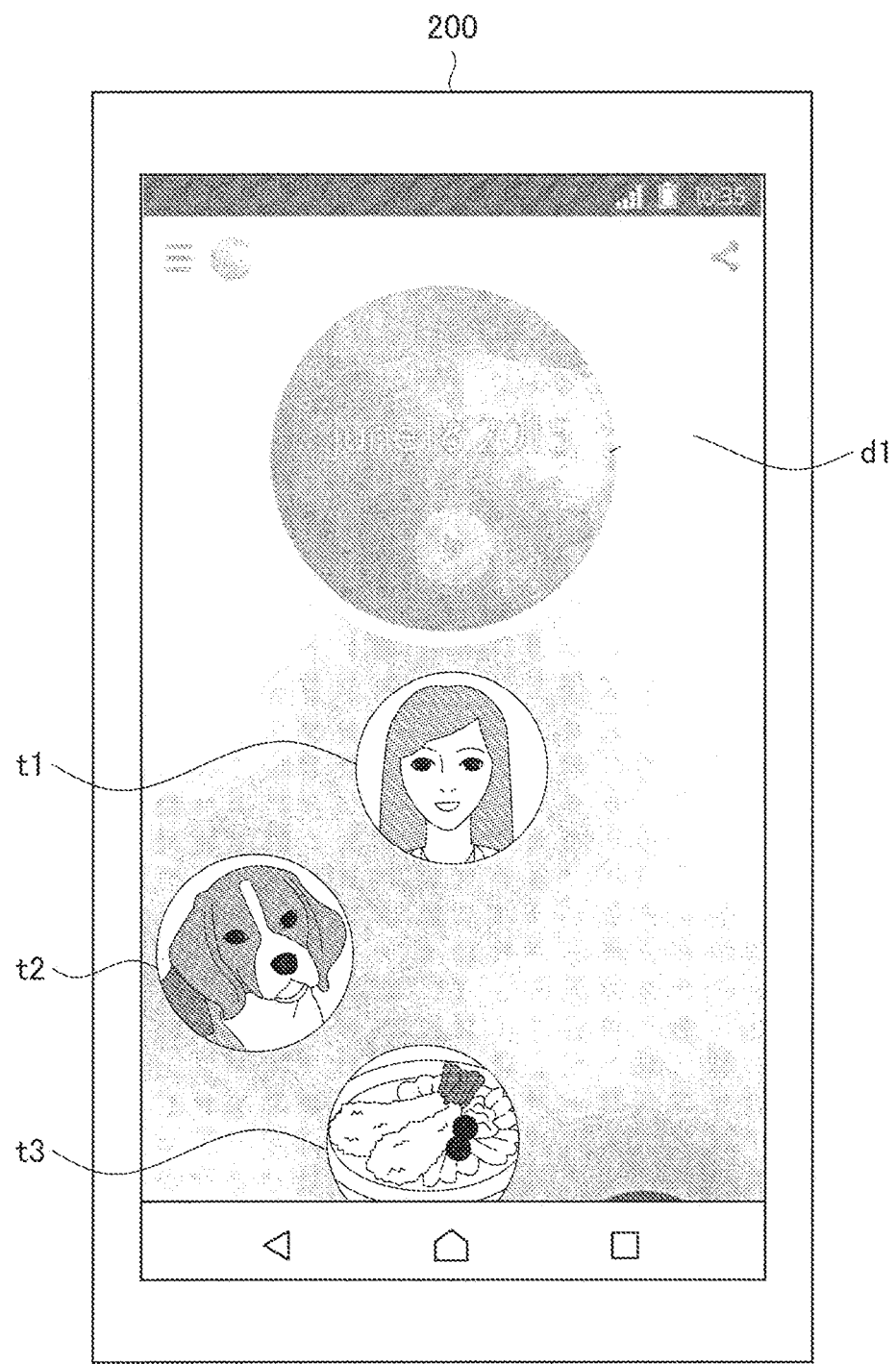
FIG. 6 is an explanatory diagram illustrating a screen example displayed by the mobile terminal 200.

FIG. 6 is an explanatory diagram illustrating an example of a screen displayed by the mobile terminal 200. FIG. 6 illustrates as a screen displayed by the mobile terminal 200, an example of the screen that the mobile terminal 200 displays thumbnails t1, t2, and t3 as information representing individual moving images obtained from the imaging device 100 and an icon d1 added with information about date when the moving image is captured. The screen illustrated in FIG. 6 is displayed in a case where the user starts, e.g., application for reproducing the image captured by the imaging device 100 with the mobile terminal 200.

On the mobile terminal 200, the screen illustrated in FIG. 6 is touched by a finger or the like of the user, or the finger or the like is allowed to come near the screen, thereby enabling an operation of the user. It is noted that, hereinafter, the operation for touching the screen by a finger or the like of the user or allowing the finger or the like to come near the screen, will be collectively described as "allow the user to touch the screen by the finger or the like", "touch the screen by the finger or the like of the user", and the like.

For example, in a case where the user touches any of the thumbnails t1, t2, and t3 by the finger or the like, the mobile terminal 200 reproduces the moving image corresponding to the thumbnails, depending on the touch. Further, for example, the user touches the icon d1 by the finger or the like, and the mobile terminal 200 continuously reproduces the moving image captured at corresponding date, depending on the touch.

In a case of reproducing the moving image obtained from the imaging device 100, the mobile terminal 200 reproduces the moving image while adding an effect that the imaging person seems to peer into the hole 101.

Figure 7:
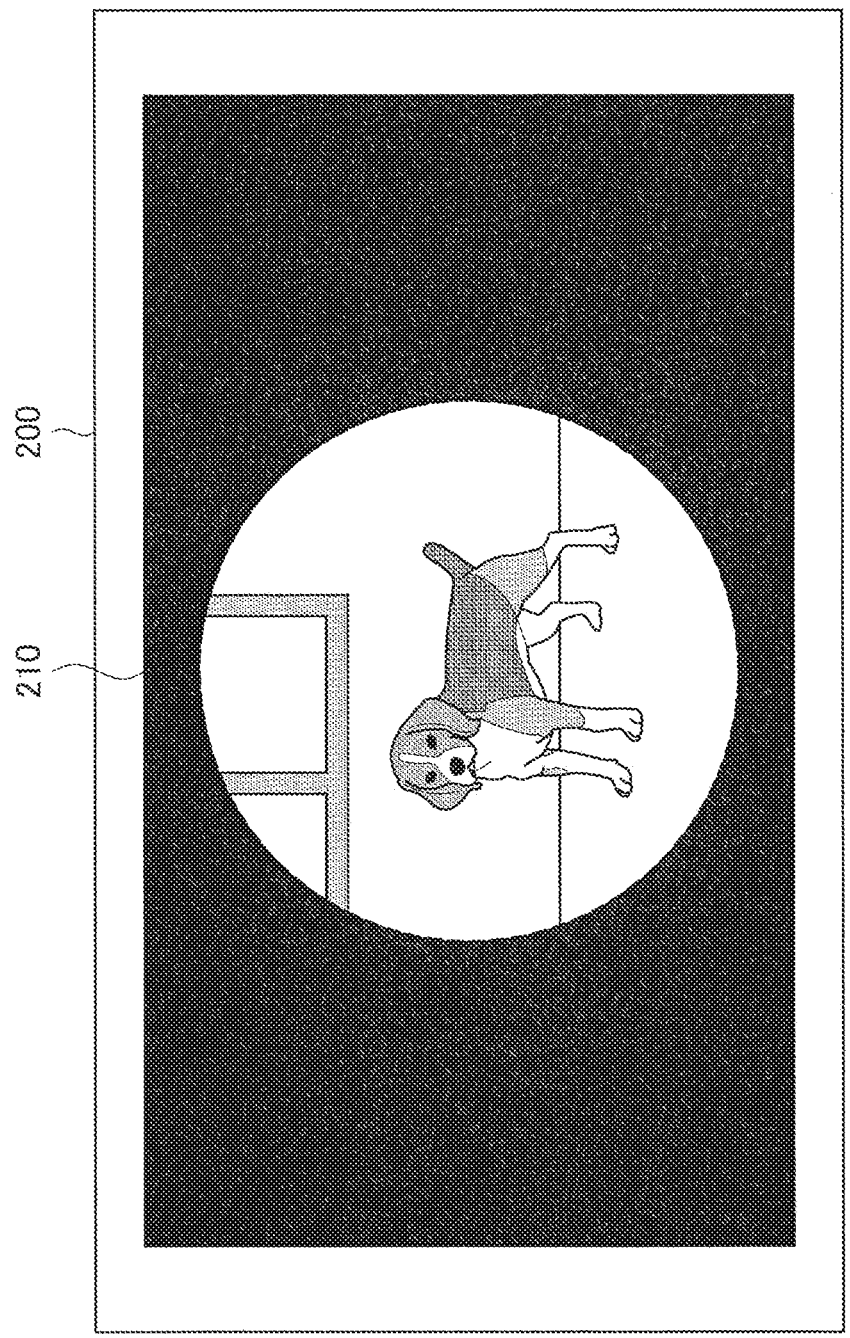
FIG. 7 is an explanatory diagram illustrating a screen example displayed by the mobile terminal 200 according to the embodiment.

FIG. 7 is an explanatory diagram illustrating the screen displayed by the mobile terminal 200 according to the embodiment of the present disclosure. FIG. 7 illustrates an example of the screen displayed by the mobile terminal 200 in a case of reproducing the moving image obtained from the imaging device 100.

FIG. 7 illustrates a state in which the moving image added with the effect that the imaging person seems to peer into the hole 101 is reproduced by the mobile terminal 200. The effect that the imaging person seems to peer into the hole 101 is given, thereby enabling reproduction with the mobile terminal 200 of the moving image similar to a field-of-view of the imaging person who captures an image by using the imaging device 100.

The mobile terminal 200 may change the effect given to the moving image by using the sensing data or the eye touch state of the imaging person obtained from the imaging device 100. The mobile terminal 200 can detect a concentrating state to the subject of the imaging person of the moving image by using the sensing data or the eye touch state of the imaging person. It is noted that the concentrating state means a state of increase in interest or the like of the imaging person to the captured subject.

That is, the mobile terminal 200 can change the effect given to the moving image, depending on the concentrating state of the imaging person. The effect given to the moving image is changed depending on the concentrating state of the imaging person, and the mobile terminal 200 can more visibly present where the imaging person concentrates (concentrating interval) to the moving image to a viewer of the moving image. The effect given on the moving image by the mobile terminal 200 will be specifically described with an example later.

[1.3. Functional Configuration Example of Imaging Device]

Figure 8:
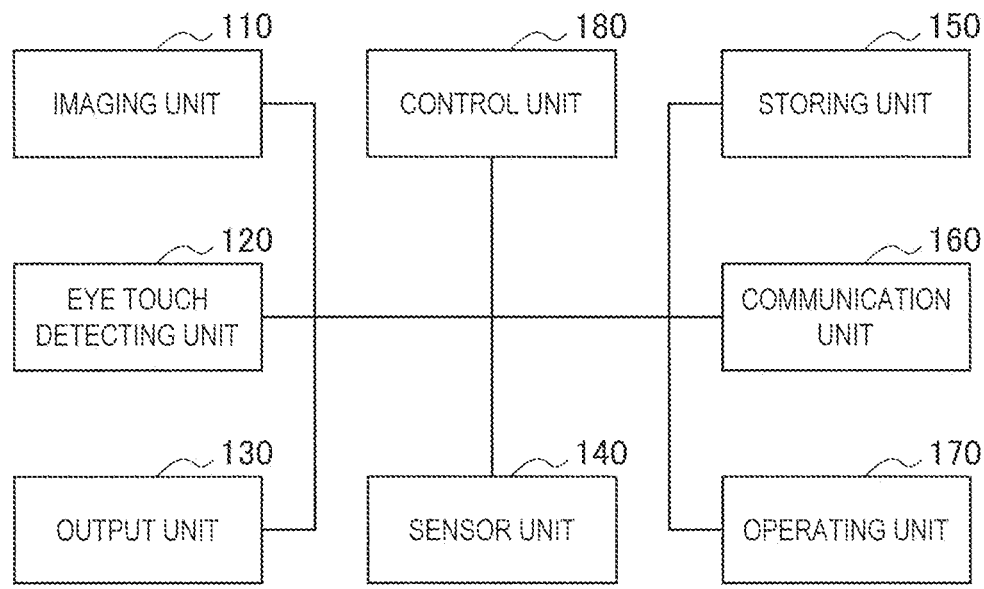
FIG. 8 is an explanatory diagram illustrating a functional configuration example of the imaging device 100 according to the embodiment.

Subsequently, a description will be given of a functional configuration example of the imaging device according to the embodiment of the present disclosure. FIG. 8 is an explanatory diagram illustrating a functional configuration example of the imaging device 100 according to the embodiment of the present disclosure. Hereinbelow, a description will be given of the functional configuration example of the imaging device 100 according to the embodiment of the present disclosure with reference to FIG. 8.

As illustrated in FIG. 8, the imaging device 100 according to the embodiment of the present disclosure includes the imaging unit 110, the eye touch detecting unit 120, an output unit 130, a sensor unit 140, a storing unit 150, a communication unit 160, an operating unit 170, and a control unit 180.

The imaging unit 110 is a camera module that captures an image, including a focusing lens, an imaging element, an A/D converter, and the like. The imaging unit 110 captures an image of real space by using an imaging element such as a charge coupled device (CCD) or a complementary metal oxide semiconductor (CMOS) to generate a captured image. A series of captured images generated by the imaging unit 110 form a video image displaying the real space. It is noted that the imaging device 100 may include a microphone that collects sound at the same time of the imaging of the moving image with the imaging unit 110.

The eye touch detecting unit 120 detects the eye touch to the hole 101 of the imaging person. The eye touch detecting unit 120 includes, e.g., a camera, an infrared sensor, and the like. By using the camera as the eye touch detecting unit 120, in addition to the eye touch to the hole 101 of the imaging person, the eye touch detecting unit 120 can detect an operation of an eyeball in a case of the eye touch to the hole 101 of the imaging person.

The output unit 130 outputs a state of the imaging device 100. The output unit 130 can include, e.g., a light emitting diode (LED), a speaker, and the like. The state of the imaging device 100 that is output by the output unit 130 includes, e.g., an on/off mode of a power source of the imaging device 100, a mode of the remaining amount of battery (not illustrated), and the like.

The sensor unit 140 obtains a state of the imaging device 100 and a state of the imaging person who captures the moving image by using the imaging device 100. As the sensor unit 140, it is possible to select at least one of various sensors such as the position measurement sensor, acceleration sensor, gyroscope sensor, geomagnetic sensor, illuminance sensor, temperature sensor, barometric air pressure sensor, and heartbeat sensor.

The storing unit 150 includes, e.g., a storage medium such as a semiconductor memory, and stores a program and data for processing with the imaging device 100. Data stored by the storing unit 150 can include, e.g., the moving image captured by the imaging unit 110, sensor data output by the sensor unit 140, and data of the eye touch state of the imaging person detected by the eye touch detecting unit 120.

Further, the storing unit 150 may store information as a determining material about whether or not the image is the moving image captured by the imaging device 100 in the mobile terminal 200, as well as the moving image captured by the imaging unit 110. The information may be, e.g., a flag indicating the moving image captured by the imaging device 100 or information of a device name of the imaging device 100.

The communication unit 160 is a communication interface that intermediates communication with another device by using the imaging device 100. The communication unit 160 supports an arbitrary wireless communication protocol or wired communication protocol to establish communication connection with another device. For example, as mentioned above, the communication unit 160 may have an antenna coil for communication with the mobile terminal 200 by using the NFC.

The operating unit 170 is an input device used for operating the imaging device 100. The operating unit 170 can include, e.g., a button for switching on/off the power source.

The control unit 180 corresponds to a processor such as a central processing unit (CPU) or a digital signal processor (DSP). The control unit 180 executes a program stored in the storing unit 150, and the eye touch detecting unit 120 detects that, for example, the eye touch to the hole 101 of the imaging person. Subsequently, the imaging of the moving image with the imaging unit 110 starts. The eye touch detecting unit 120 does not detect the eye touch to the hole 101 of the imaging person and the imaging of the moving image with the imaging unit 110 can end.

The control unit 180 allows the moving image captured by the imaging unit 110 to be stored in the storing unit 150. Further, the control unit 180 allows the sensing data output by the sensor unit 140 for a period to capture the moving image by the imaging unit 110 to be stored in the storing unit 150.

The above-mentioned imaging unit 110, eye touch detecting unit 120, output unit 130, sensor unit 140, storing unit 150, communication unit 160, operating unit 170, and control unit 180 are connected to each other by a bus in the imaging device 100.

The imaging device 100 has the configuration illustrated in FIG. 8, and thus the imaging of the moving image starts, corresponding to the eye touch to the hole 101 of the imaging person, and the moving image can be stored in the storing unit 150.

It is inevitable that there is a difference depending on users in an image actually viewed through the hole 101 of the imaging device 100, due to the difference in right and left dominant eyes and a habit for holding the imaging device 100. Therefore, even with image processing to the image captured by the imaging unit 110, there might be a problem in accuracy or precision. Therefore, the imaging device 100 may execute calibration or a test function at the initial setting time. The imaging device 100 executes the calibration or the test function at the initial setting time, thereby enabling reduction in factors that cause the above-mentioned differences such as the holding habit of each user.

The above description is given of the functional configuration example of the imaging device 100 according to the embodiment of the present disclosure with reference to FIG. 8. Subsequently, a description will be given of a functional configuration example of the mobile terminal 200 according to the embodiment of the present disclosure.

[1.4. Functional Configuration Example of Mobile Terminal]

Figure 9:
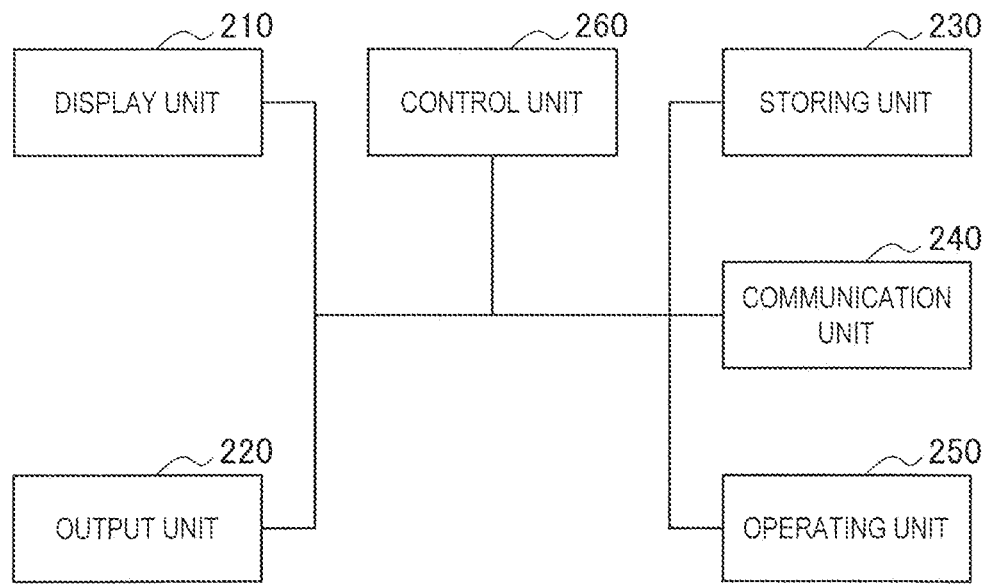
FIG. 9 is an explanatory diagram showing a functional configuration example of the mobile terminal 200 according to the embodiment.

FIG. 9 is an explanatory diagram illustrating a functional configuration example of the mobile terminal 200 according to the embodiment of the present disclosure. Hereinbelow, a description will be given of the functional configuration example of the mobile terminal 200 according to the embodiment of the present disclosure with reference to FIG. 9.

As illustrated in FIG. 9, the mobile terminal 200 according to the embodiment of the present disclosure includes a display unit 210, an output unit 220, a storing unit 230, a communication unit 240, an operating unit 250, and a control unit 260.

The display unit 210 displays a character, an image, and other information on the basis of control of the control unit 260. The display unit 210 is a display module including a display such as an LCD or OLED. The display unit 210 is used to display, e.g., the moving image captured by the imaging device 100. It is noted that the display unit 210 may not necessarily be a part of the mobile terminal 200. For example, a display device connected to the mobile terminal 200 by a wired or wireless manner may be used as the display unit 210. Also, for example, in addition to the function for displaying the information on the mobile terminal 200 itself, or in place of the function for displaying the information on the mobile terminal 200 itself, e.g., a function for projecting the information on a wall may be included.

The output unit 220 outputs sound or light on the basis of control of the control unit 260. The output unit 220 can include a device such as a speaker or an LED.

The storing unit 230 includes, e.g., a storage medium such as a semiconductor memory, and stores a program and data for processing with the mobile terminal 200. Data stored in the storing unit 230 can include, e.g., the moving image captured by the imaging device 100, the sensor data, or the data of the eye touch state of the imaging person, obtained from the imaging device 100.

The communication unit 240 is a communication interface that intermediates communication with another device by the mobile terminal 200. The communication unit 240 supports an arbitrary wireless communication protocol or wired communication protocol to establish the communication connection with another device. For example, as mentioned above, the communication unit 240 may have an antenna coil for communication with the imaging device 100 by using the NFC.

The operating unit 250 is an input device used for operating the mobile terminal 200 by the user or inputting the information to the mobile terminal 200. The operating unit 250 may include a touch sensor for detecting the touch of the user onto, e.g., a screen of the display unit 210. Preferably, the touch sensor can detect the touch of two or more points. However, the device is not limited to that detectable of the touch of two or more points. In place of the device (or in addition to that), the operating unit 250 may include a pointing device such as a mouse or a touch pad. Further, the operating unit 250 may include another kind of input devices, such as a keyboard, a keypad, a button, or a switch.

The control unit 260 corresponds to a processor such as a CPU or a DSP. The control unit 260 displays a list screen for displaying a thumbnail image of the moving image obtained from the imaging device 100 and a folder for storing a plurality of the moving images on a display unit 210. Further, in a case of displaying the list screen on the display unit 210, the control unit 260 adds a visual effect to the thumbnail image or folder. Furthermore, in the case of displaying the list screen on the display unit 210, the control unit 260 changes the visual effect added to the thumbnail image or folder by using various information obtained at time for capturing the moving image.

Although the details will be described later, there is an example in the following. In the case of displaying the list screen on the display unit 210, the control unit 260 adds a visual effect for ink blurring is blurred at the periphery of a thumbnail image or inside the folder. Further, the control unit 260 changes substance of the visual effect for ink blurring, added to the thumbnail image or the folder, depending on, for example, a situation of an imaging target of the moving image, an environment situation at the imaging time, a situation of an imaging person at the imaging time, or the like. The control unit 260 adds a visual effect for ink splashing at the periphery of the thumbnail image, for example, in a case where the imaging target of the moving image wildly move around. The control unit 260 further may extract color matching the duration of, for example, a moving image corresponding to the thumbnail image, and set the ink color blurred-out at the periphery of the thumbnail image as the extracted color.

The mobile terminal 200 according to the embodiment of the present disclosure has the configuration, thereby enabling the display of the content with easy view about which moving image is stored on the list screen.

The above description is given of the functional configuration example of the mobile terminal 200 according to the embodiment of the present disclosure. Subsequently, a description will be given of an operating example of the mobile terminal 200 according to the embodiment of the present disclosure.

[1.5. Operational Example of Mobile Terminal]

Figure 10:
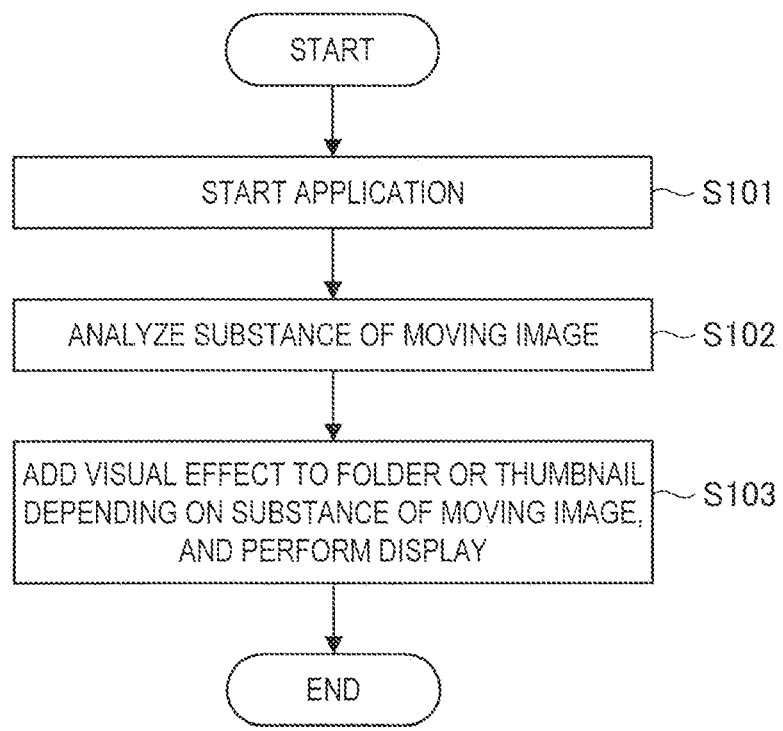
FIG. 10 is a flowchart illustrating an operational example of the mobile terminal 200 according to the embodiment.

FIG. 10 is a flowchart illustrating an operational example of the mobile terminal 200 according to the embodiment of the present disclosure. FIG. 10 illustrates a flow from the start of application for displaying the thumbnail of the moving image captured by using the imaging device 100 or the folder for storing the moving image by the mobile terminal 200 as a list of the content to the addition of the visual effect to the folder or the thumbnail. Hereinbelow, a description will be given of the operational example of the mobile terminal 200 according to the embodiment of the present disclosure with reference to FIG. 10.

The mobile terminal 200 starts the application with the operation of the user (step S101), and analyzes the substance of the moving image corresponding to the displayed folder or thumbnail (step S102). Processing in step S102 is executed by, for example, the control unit 260. The mobile terminal 200 analyzes and obtains a situation of the imaging target of the moving image captured by the imaging device 100, an environment situation at the imaging time, a situation of the imaging person at the imaging time, as the substance of the moving image.

The substance of the moving image corresponding to the displayed folder or thumbnail is analyzed in the step S102, and the mobile terminal 200 subsequently adds a visual effect to the folder or thumbnail depending on the substance of the moving image obtained by the analysis, and performs display (step S103). Processing in step S103 is executed by, for example, the control unit 260.

As a consequence of executing the above operation, the mobile terminal 200 according to the embodiment of the present disclosure can display with easy view, which moving image is stored on the list screen of the content.

Subsequently, a description will be given of an example of a screen displayed on the display unit 210 by the mobile terminal 200 with reference to the drawings.

(1) Reproduce Moving Image with Highlight on Thumbnail

Figure 11:
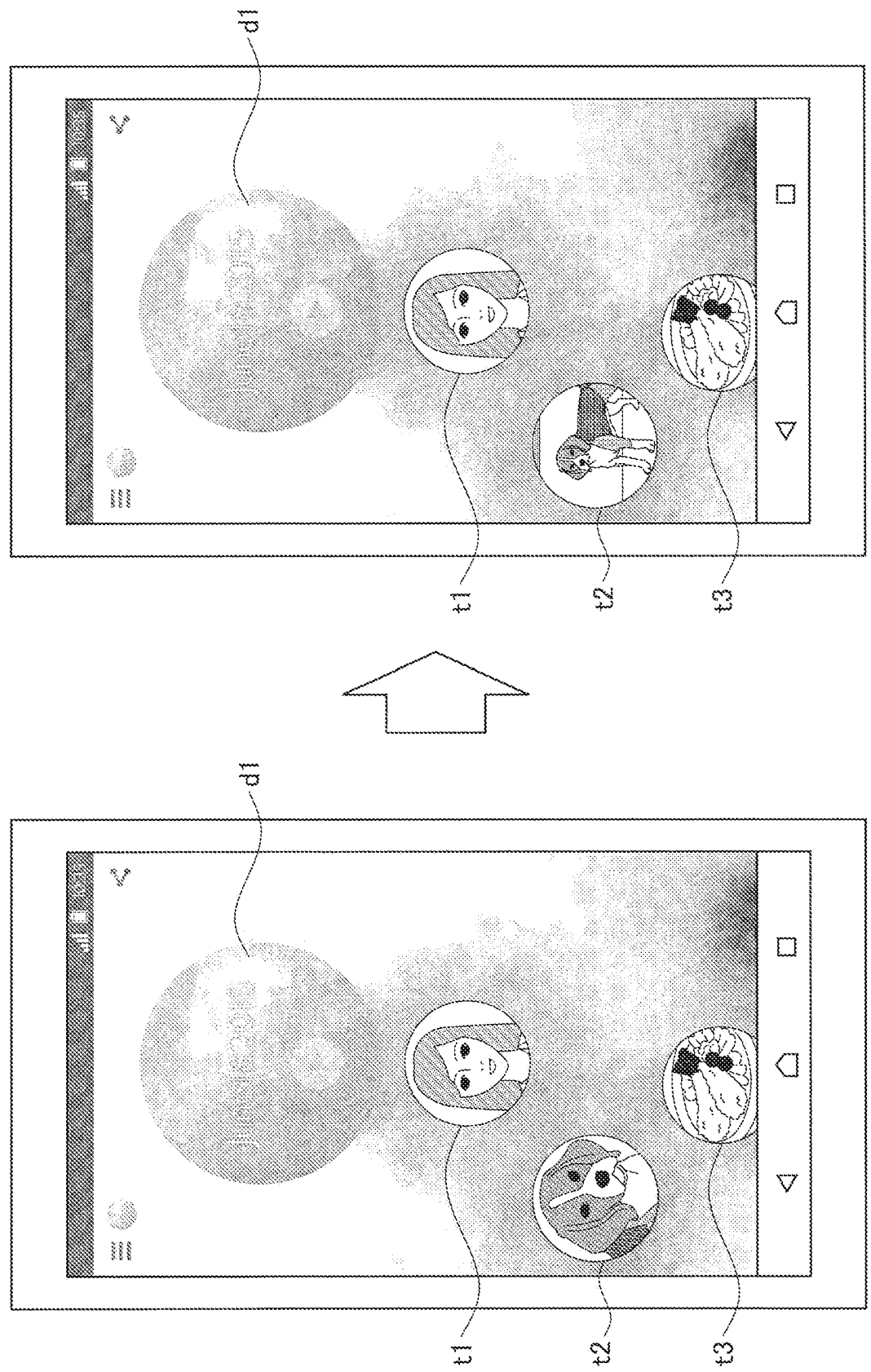
FIG. 11 is an explanatory diagram illustrating an example of a screen displayed on a display unit 210 by the mobile terminal 200.

FIG. 11 is an explanatory diagram illustrating an example of a screen displayed on the display unit 210 by the mobile terminal 200. FIG. 11 illustrates the example of the screen displayed on the display unit 210 by the mobile terminal 200 in a case of reproducing the moving image displayed on a thumbnail t2 with highlight (extracting and reproducing a part of the moving image). Between the right and left in FIG. 11, images displayed on the thumbnail t2 are changed and it is illustrated that the moving image displayed on the thumbnail t2 is reproduced with highlight.

Figure 12:
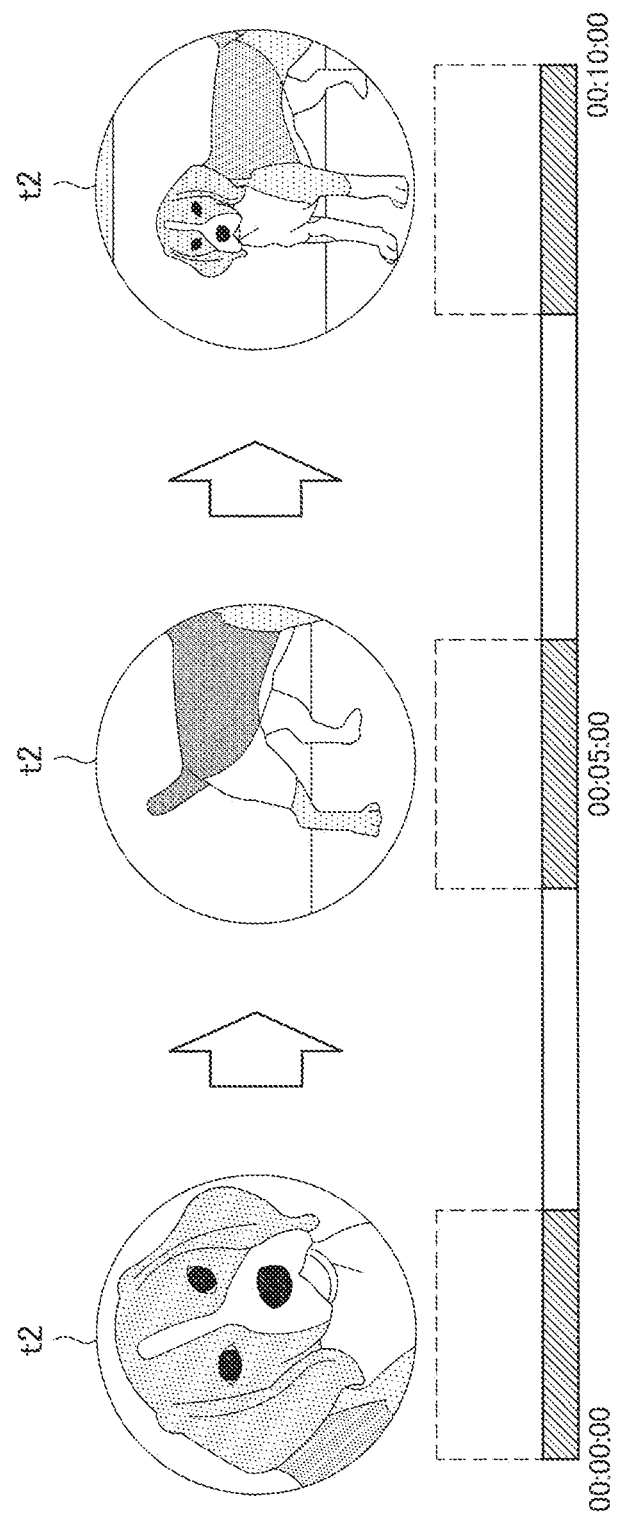
FIG. 12 is an explanatory diagram illustrating an example of a reproducing interval of a moving image in a case of reproducing a moving image displayed on a thumbnail with highlight.

FIG. 12 is an explanatory diagram illustrating an example of a reproducing interval of the moving image in a case of reproducing the moving image displayed on the thumbnail t2 with highlight by the mobile terminal 200. The example illustrated in FIG. 12 illustrates that the mobile terminal 200 reproduces, with highlight, a predetermined interval from the head, a predetermined interval around 5 minutes, a predetermined interval by 10 minutes in the moving images for 10 minutes. As illustrated in FIG. 12, the mobile terminal 200 extracts and reproduces a part of the moving image corresponding to the thumbnail t2, thereby enabling the presentation with easy view of the substance of the moving image corresponding to the thumbnail t2 to the user.

(2) Change Blurring State at Periphery of Thumbnail

FIG. 13 is an explanatory diagram illustrating an example of the screen displayed on the display unit 210 by the mobile terminal 200. FIG. 13 illustrates the example of the screen displayed on the display unit 210 by the mobile terminal 200 in a case of changing a blurring state of the ink at the periphery of the thumbnail t2 depending on the substance of the moving image corresponding to the thumbnail t2.

For example, in a case where a thing such as flower without motion or a sleeping cat with a small amount of motion is captured in the moving image corresponding to the thumbnail t2, the mobile terminal 200 adds a visual effect that ink is gradually blurred at the periphery of the thumbnail t2, as illustrated in the right in FIG. 13, and displays the image on the display unit 210. On the other hand, for example, in a case of a thing captured in the moving image corresponding to the thumbnail t2 with a large amount of motion such as a cat that wildly runs around, the mobile terminal 200 adds a visual effect to splash ink at the periphery of the thumbnail t2, as illustrated in the right in FIG. 13, and displays the image on the display unit 210.

As illustrated in FIG. 13, the blurring state of the ink at the periphery of the thumbnail t2 is changed depending on the substance of the moving image corresponding to the thumbnail t2, and the mobile terminal 200 thus can present, with easy view, the substance of the moving image corresponding to the thumbnail t2 to the user.

(3) Change Color at Periphery of Thumbnail with Reproduction of Moving Image.

Figure 14:
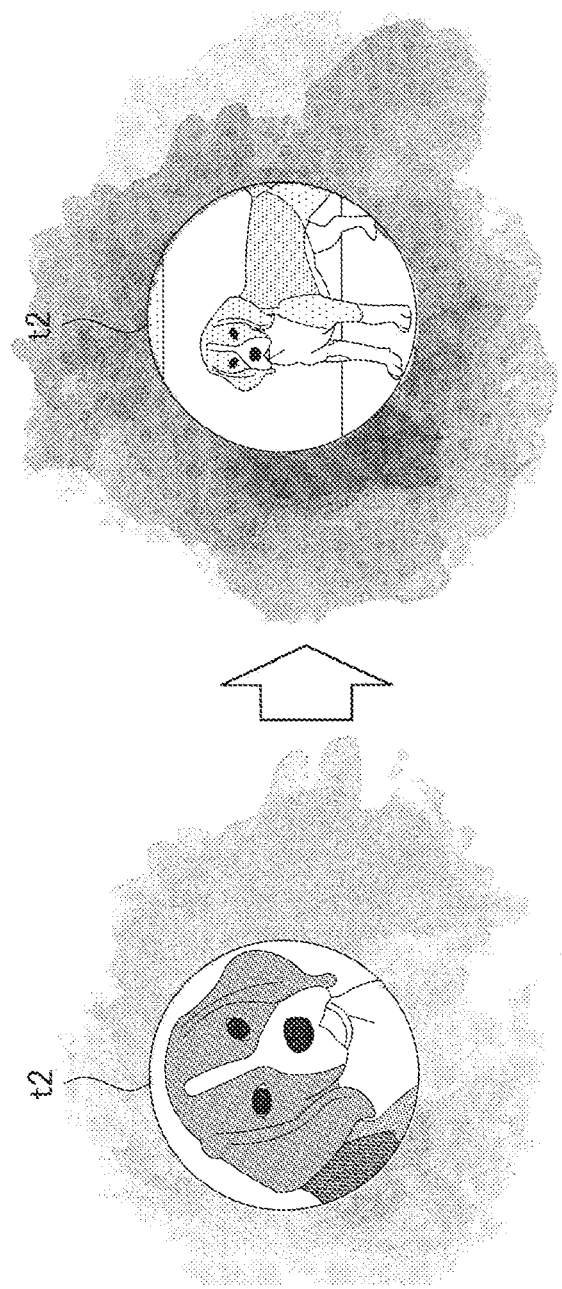
FIG. 14 is an explanatory diagram illustrating an example of the screen displayed on the display unit 210 by the mobile terminal 200.

FIG. 14 is an explanatory diagram illustrating an example of the screen displayed on the display unit 210 by the mobile terminal 200. FIG. 14 illustrates an example of the screen displayed on the display unit 210 by the mobile terminal 200 in a case of changing the color of the ink at the periphery of the thumbnail t2 with highlight reproduction of the moving image corresponding to the thumbnail t2.

As illustrated in FIG. 14, the color of the ink at the periphery of the thumbnail t2 is changed in a case of extracting and reproducing a part of the moving image corresponding to the thumbnail t2, and the mobile terminal 200 can present, with easy view, the substance of the moving image corresponding to the thumbnail t2 to the user.

(4) Another Example of Visual Effect Depending on Imaging Target of Moving Image FIGS. 15A and 15B are explanatory diagrams illustrating examples of changing the visual effect added to the thumbnail or folder by the mobile terminal 200 depending on the situation of the imaging target of the moving image.

For example, in a case where a value of speed of a main subject in the moving image is large, the mobile terminal 200 may express violent motion of the subject, by increasing blurring speed of the ink at the periphery of the thumbnail, increasing the number of switching times in a case of highlight reproduction, or reducing the time to the switching. On the other hand, in a case where a value of the speed of the main subject is small in the moving image, the mobile terminal 200 may express small motion of the subject by setting the blurring speed of ink at the periphery of the thumbnail to be slow, reducing the number of switching times in the case of highlight reproduction, or prolonging the time to the switching.

For example, in a case where a value of the area of the main subject in the moving image is high, the mobile terminal 200 may express the scale of the area of the subject in the moving image by widening a blurring range of ink at the periphery of the thumbnail. On the other hand, in a case where the value of the area of the main subject in the image is low, the mobile terminal 200 may express the small area of the subject in the moving image by narrowing the blurring range of ink at the periphery of the thumbnail. It is noted that the mobile terminal 200 may express the scale of the area of the subject in the image by the scale of the thumbnail, in place of the scale of the blurring range of ink.

For example, in a case where the main subject in the moving image is a moving material, the mobile terminal 200 may express that the subject in the moving image is moved by largely moving the blur of ink at the periphery of the thumbnail. On the other hand, in a case where the main subject in the image is an unmoving material or a material with a small amount of motion even in a case of being moved, the mobile terminal 200 may express a small or none of amount of motion of the subject in the moving image by moving the blur of ink at the periphery of the thumbnail with a small amount of motion or without an amount of motion. It is noted that the mobile terminal 200 may express the difference in subject in the moving image by the difference in substance displayed at the periphery of the thumbnail, in place of the motion of the blur of ink at the periphery of the thumbnail. For example, in a case where the main subject in the moving image is a pet as illustrated in FIG. 15B, the mobile terminal 200 may display an image like a foot mark at the periphery of the thumbnail. Further, for example, as illustrated in FIG. 15B, in a case where the main subject in the moving image is a plant, the mobile terminal 200 may display an image like a petal at the periphery of the thumbnail.

For example, in a case where the moving image is captured as a distant view like a landscape, the mobile terminal 200 may express that the moving image is captured as a distant view by increasing the number of the ink color at the periphery of the thumbnail. On the other hand, in a case where the moving image is captured as a near view, the mobile terminal 200 may express that the moving image is captured as a near view by reducing the number of the ink color at the periphery of the thumbnail.

For example, in a case where the blur of the main subject in the moving image is strong, the mobile terminal 200 may express that the blur of the main subject in the moving image is strong by emphasizing the blur of ink at the periphery of the thumbnail. On the other hand, in a case where the blur of the main subject in the moving image is weak or there is not blur, the mobile terminal 200 may express that the blur of the main subject in the moving image is weak or there is not blur by reducing the blur of ink at the periphery of the thumbnail.

(5) Example of Visual Effect Depending on Situation of Imaging Environment of Moving Image FIGS. 16A, 16B, and 17 are explanatory diagrams illustrating examples of changing the visual effect added to the thumbnail or folder by the mobile terminal 200 depending on a situation of imaging environment of the moving image.

For example, in a case where the weather at the imaging time of the moving image is good, the mobile terminal 200 may express that the weather at the imaging time of the moving image is good by making, red, the ink color at the periphery of the thumbnail or the like. On the other hand, in a case where the weather at the imaging time of the moving image is bad, the mobile terminal 200 may express that the weather at the imaging time of the moving image is bad by making, blue, the ink color at the periphery of the thumbnail or the like. It is noted that information about the weather at the imaging time of the moving image may be added as meta data of the moving image at the imaging time of the imaging device 100, and the mobile terminal 200 may search and obtain weather information on the Internet or the like by using information about the imaging date and time and the imaging place in a case of analyzing the moving image.

It is noted that the mobile terminal 200 may express the difference in weather by the difference in animation, in place of the ink color at the periphery of the thumbnail. For example, in a case where the weather at the imaging time of the moving image is fine, the mobile terminal 200 may display animation like the sun at the periphery of the thumbnail. Further, for example, in a case where the weather at the imaging time of the moving image is rain, the mobile terminal 200 may display animation like raining at the periphery of the thumbnail. Further, for example, in a case where the weather at the imaging time of the moving image is snow, the mobile terminal 200 may display animation like snowing at the periphery of the thumbnail.

For example, in a case where the humidity is high at the imaging time of the moving image, the mobile terminal 200 may express high humidity at the imaging time of the moving image by increasing the blurring speed of ink at the periphery of the thumbnail, making, bright, the color at the periphery of the thumbnail, or making, thick, the color at the periphery of the thumbnail. On the other hand, in a case where the humidity is low at the imaging time of the moving image, the mobile terminal 200 may express high humidity at the imaging time of the moving image by reducing the blurring speed of ink at the periphery of the thumbnail, darkening the color at the periphery of the thumbnail, or making, thin, the color at the periphery of the thumbnail. It is noted that information about the humidity at the imaging time of the moving image may be added as meta data of the moving image at the imaging time of the imaging device 100, or the mobile terminal 200 may search and obtain information about the humidity on the Internet or the like by using information about the imaging date and time and the imaging place in a case of analyzing the moving image.

For example, in a case where the temperature is high at the imaging time of the moving image, the mobile terminal 200 may express high temperature at the imaging time of the moving image by making, red, the color at the periphery of the thumbnail or displaying animation like largely spreading fire at the periphery of the thumbnail. In a case of displaying the animation like largely spreading fire at the periphery of the thumbnail, the mobile terminal 200 may change a range of fire in proportional to the temperature. On the other hand, in a case where the temperature is low at the imaging time of the moving image, the mobile terminal 200 may express low temperature at the imaging time of the moving image by making, blue, the color at the periphery of the thumbnail and displaying animation like ice spreading at the periphery of the thumbnail. The mobile terminal 200 may change a range of ice in proportional to the temperature in a case of displaying the animation like ice spreading at the periphery of the thumbnail. It is noted that the temperature information at the imaging time of the moving image may be added as meta data of the moving image at the imaging time of the imaging device 100, and the mobile terminal 200 may search and obtain information about the temperature on the Internet or the like by using information about the imaging date and time and the imaging place in a case of analyzing the moving image.

For example, in a case where ambient sound at the imaging time of the moving image is big, the mobile terminal 200 may express that the ambient sound at the imaging time of the moving image is big by displaying animation like an equalizer at the periphery of the thumbnail, and increasing the number of bars of the equalizer or increasing the motion thereof. On the other hand, in a case where the ambient sound at the imaging time of the moving image is soft, the mobile terminal 200 may express that the ambient sound at the imaging time of the moving image is soft by displaying animation like an equalizer at the periphery of the thumbnail, and reducing the number of bars of the equalizer or reducing the motion thereof.

For example, in a case where the amount of ambient wind is high at the imaging time of the moving image, the mobile terminal 200 may express that the amount of ambient wind is high at the imaging time of the moving image by displaying animation like smoking at the periphery of the thumbnail, and increasing the amount of smoke or increasing the motion thereof. On the other hand, in a case where the amount of ambient wind is low at the imaging time of the moving image, the mobile terminal 200 may express that the amount of ambient wind at the imaging time of the moving image is small by displaying animation like smoking at the periphery of the thumbnail, and reducing the amount of smoke or reducing the motion or unmoving the smoke. It is noted that the mobile terminal 200 may obtain information about the amount of ambient wind at the imaging time of the moving image by the presence or absence of wind noise of sound collected at the imaging time of the imaging device 100, or search and obtain information about wind speed and wind direction on the Internet or the like by using information about the imaging date and time and the imaging place.

For example, in a case where ambient brightness is high at the imaging time of the moving image, the mobile terminal 200 may express that the ambient brightness is high at the imaging time of the moving image by displaying animation that the periphery of the thumbnail seems to be shiny, and widening the width of luster or displaying animation in bright color. On the other hand, in a case where the ambient brightness is dark at the imaging time of the moving image, the mobile terminal 200 may express that the ambient brightness is dark at the imaging time of the moving image by displaying animation that the periphery of the thumbnail seems to be shiny, narrowing the width of luster, or displaying the animation in dark color. It is noted that the mobile terminal 200 may obtain information about the ambient brightness at the imaging time of the moving image from a value of an illuminance sensor obtained at the imaging time of the imaging device 100, or search and obtain information about the presence or absence of sunlight on the Internet or the like by using information about the imaging date and time and the imaging place.

For example, in a case where the imaging time of the moving image is long, the mobile terminal 200 may express that the imaging time of the moving image is long by reducing the blurring speed of ink displayed at the periphery of the thumbnail. On the other hand, in a case where the imaging time of the moving image is short, the mobile terminal 200 may express that the imaging time of the moving image is short by increasing the blurring speed of ink displayed at the periphery of the thumbnail. It is noted that the mobile terminal 200 may change a blurring range of ink depending on the duration of the imaging time. FIG. 17 illustrates an example in which a visual effect that ink is blurred at only a part of the periphery of the thumbnail at short duration of the imaging time and a visual effect that ink is blurred at all the periphery of the thumbnail at long duration of the imaging time.

For example, in a case where the height of the imaging place of the moving image is high, the mobile terminal 200 may express that the height of the imaging place of the moving image is long by increasing a sequence of thumbnails corresponding to the moving image, or overlappingly displaying the thumbnail on another thumbnail. On the other hand, in a case where the height of the imaging place of the moving image is low, the mobile terminal 200 may express the height of the imaging place of the moving image is low by making a sequence of thumbnails corresponding to the moving image or overlappingly displaying the thumbnail under another thumbnail. It is noted that height information at the imaging time of the moving image may be obtained from a barometric air pressure sensor or the like at the imaging time of the imaging device 100. Further, the information obtained from the barometric air pressure sensor or the like may be added as meta data of the moving image at the imaging time of the imaging device 100.

(6) Example of Visual Effect Corresponding to Situation of Imaging Person of Moving Image FIG. 18 is an explanatory diagram illustrating an example of changing the visual effect added to the thumbnail or folder by the mobile terminal 200 depending on a situation of the imaging person of the moving image at the imaging time.

For example, in a case where the motion of the gaze of the imaging person of the moving image or a value of moving speed of the imaging device 100 is high, the mobile terminal 200 may express the large motion of the subject by increasing the blurring speed of ink at the periphery of the thumbnail, increasing the number of switching times in a case of reproduction with highlight, or reducing the time to the switching. On the other hand, in a case where the motion of gaze of the imaging person in the moving image or a value of moving speed of the imaging device 100 is small, the mobile terminal 200 may express a small amount of the motion of the subject by reducing the blurring speed of ink at the periphery of the thumbnail, reducing the number of switching times or prolonging the time to the switching in a case of reproduction with highlight.

For example, in a case where an amount of sweating of the imaging person is large at the imaging time of the moving image, the mobile terminal 200 may express a large amount of sweating of the imaging person by increasing an amount of particle expression at the periphery of the thumbnail. On the other hand, in a case where the amount of sweating of the imaging person is small at the imaging time of the moving image, the mobile terminal 200 may express a small amount of sweating of the imaging person by reducing the amount of particle expression at the periphery of the thumbnail.

For example, in a case where pulsing of the imaging person is quick at the imaging time of the moving image, the mobile terminal 200 may express the speed of the pulsing of the imaging person with the display of a visual effect for pulsing at the periphery of the thumbnail and quick motion thereof. On the other hand, in a case where the pulsing of the imaging person is slow at the imaging time of the moving image, the mobile terminal 200 may express slow pulsing of the imaging person with display of a visual effect like pulsing at the periphery of the thumbnail and slow motion thereof.

For example, in a case where it is understood from sensing data of a sensor that obtains biological information and emotion of the imaging person is in an exciting state at the imaging time of the moving image, the mobile terminal 200 may express an exciting state of the imaging person by displaying a visual effect like pulsing at the periphery of the thumbnail, and increasing the speed of motion or displaying a notched visual effect and strengthening the effect. On the other hand, in a case where a feeling of the imaging person is in a sad state or a melancholic state at the imaging time of the moving image with sensing data of a sensor that obtains biological information, the mobile terminal 200 may express a sad state or a melancholic state of the imaging person by displaying a visual effect like pulsing at the periphery of the thumbnail and delaying the motion, or displaying a notched visual effect and weakening the effect. It is noted that biological information can include information such as heart beating, body temperature, sweating, blood pressure, sweating, pulsing, breathing, blinking eye, eyeball motion, diameter of pupil, brain waves, and the like.

For example, in a case where the imaging person is deeply interested in the subject or has high concentration degree to the subject as a result that the distance between the imaging person and the imaging device 100 is short at the imaging time of the moving image or the line of sight is not moved, the mobile terminal 200 may express the degree of interest or the concentration degree of the imaging person is high by reducing the blurring speed of ink to the periphery of the thumbnail. On the other hand, in a case where the imaging person does not have so much interest on the subject or has low concentration degree to the subject as a result that the distance between the imaging person and the imaging device 100 is long or the line of sight is moved in any direction at the imaging time of the moving image, the mobile terminal 200 may express a low degree of interest of the imaging person or low concentration degree by increasing the blurring speed of ink at the periphery of the thumbnail. Further, for example, the mobile terminal 200 may change a visual effect given to the thumbnail or folder depending on a behavior state of the user. The behavior state of the user can include, for example, a still state, a walking state, a running state, up/down on steps, driving of a bicycle, an automobile, another moving member, and the like.

(7) Example of Visual Effect to Folder

Subsequently, an example will be given of a visual effect to the folder for storing a plurality of the moving images. It is noted that the folder is an example of inclusive content according to the present disclosure. FIG. 19 is an explanatory diagram illustrating an example of a visual effect added to the folder by the mobile terminal 200. FIG. 19 illustrates a state in which ink color displayed in an icon d1 is changed on time series of the moving image stored in the icon d1. The mobile terminal 200 can present with easy view, to the user, with which atmosphere the moving image is included in the icon d1 by changing the ink color displayed in the icon d1 as mentioned above on time series of the moving image stored in the icon d1.

Figure 20:
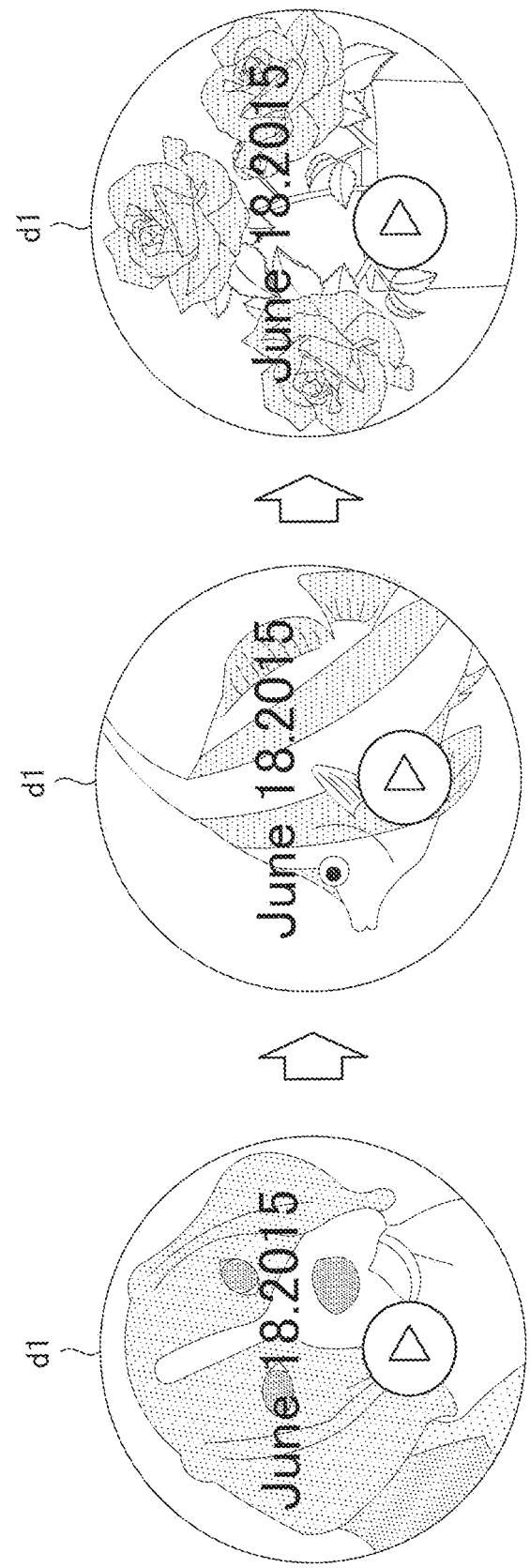
FIG. 20 is an explanatory diagram illustrating an example of the screen displayed on the display unit 210 by the mobile terminal 200.

FIG. 20 is an explanatory diagram illustrating an example of a visual effect added to the folder by the mobile terminal 200. FIG. 20 illustrates a state in which the thumbnail displayed in the icon d1 is changed on time series of the moving image stored in the icon d1. The mobile terminal 200 can present with easy view, to the user, with which atmosphere the moving image is included in the icon d1 by changing the thumbnail displayed in the icon d1 as mentioned above on time series of the moving image stored in the icon d1. It is noted that the mobile terminal 200 may add a visual effect that ink is blurred in the icon d1 as mentioned above in a case of displaying the thumbnail in the icon d1.

FIG. 21 is an explanatory diagram illustrating an example of a visual effect that the mobile terminal 200 adds to a folder. FIG. 21 illustrates an example in which the mobile terminal 200 changes the number of the ink color blurred in the icon d1 depending on the number of the moving image stored in the icon d1. The mobile terminal 200 changes the number of the ink color displayed in the icon d1 as mentioned above depending on the number of the moving image stored in the icon d1, thereby enabling easy presentation, to the user, with which degree the moving image is included in the icon d1.

FIG. 22 is an explanatory diagram illustrating an example of a visual effect added to the folder by the mobile terminal 200. FIG. 22 illustrates an example in which the mobile terminal 200 changes an effect in a case where the user taps the icon d1 depending on the number of the moving images stored in the icon d1. In a case where the user taps the icon d1, the mobile terminal 200 may add a visual effect to widen wave patterns in the icon d1. In this case, for example, in a case where the number of the moving images included in the icon d1 is small, the mobile terminal 200 may quickly widen the wave patterns in the case where the user taps the icon d1. In a case where the number of the moving images included in the icon d1 is large, the user may slowly widen the wave pattern in a case of tapping the icon d1. Of course, a relationship between the number of the moving images included in the icon d1 and speed for widening the wave pattern may be opposite. The mobile terminal 200 changes the effect displayed on the icon d1 depending on the number of the moving images stored in the icon d1 as mentioned above, thereby enabling easy presentation, to the user, with which degree the moving image is included in the icon d1.

FIG. 23 is an explanatory diagram illustrating an example of a visual effect added to the folder by the mobile terminal 200. FIG. 23 illustrates an example in which the mobile terminal 200 changes the effect in a case where the user touches and scrolls the icon d1, depending on the number of the moving images stored in the icon d1. In a case where the user touches and scrolls the icon d1, the mobile terminal 200 may change, for example, scrolling speed depending on the number of the moving images included in the icon d1. Further, the mobile terminal 200 may add an effect to, for example, feel the weight with vibration in a case where the number of the moving image included in the icon d1 is large.

(8) Another Example of Visual Effect to List Screen

Figure 24:
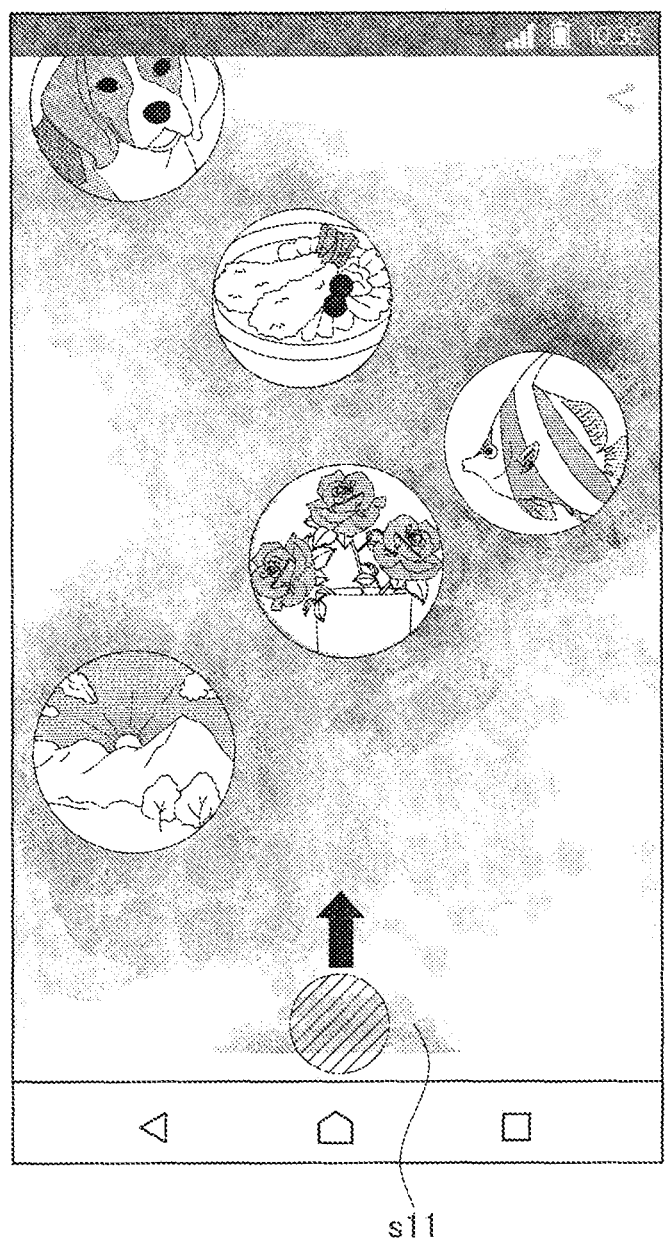
FIG. 24 is an explanatory diagram illustrating an example of the screen displayed on the display unit 210 by the mobile terminal 200.

Subsequently, an example of the visual effect to the list screen will be illustrated. FIG. 24 is an explanatory diagram illustrating an example of a visual effect added to the list screen by the mobile terminal 200. FIG. 24 illustrates an example in which the mobile terminal 200 adds a visual effect to recognize the end of the list screen in a case where the user scrolls the image to the end thereof. Reference symbol s11 in FIG. 24 indicates a visual effect that the mobile terminal 200 adds to the list screen, and also indicates blurring to recognize the end of the list screen. As mentioned above, the mobile terminal 200 adds the visual effect to recognize the end of the list screen, thereby enabling easy presentation that more scroll in the up direction is not possible to the user.

It is noted that, in a case where the user scrolls the image to the end of the list screen, the mobile terminal 200 may add a visual effect to bind the list screen depending on the scrolling force.

Figure 25:
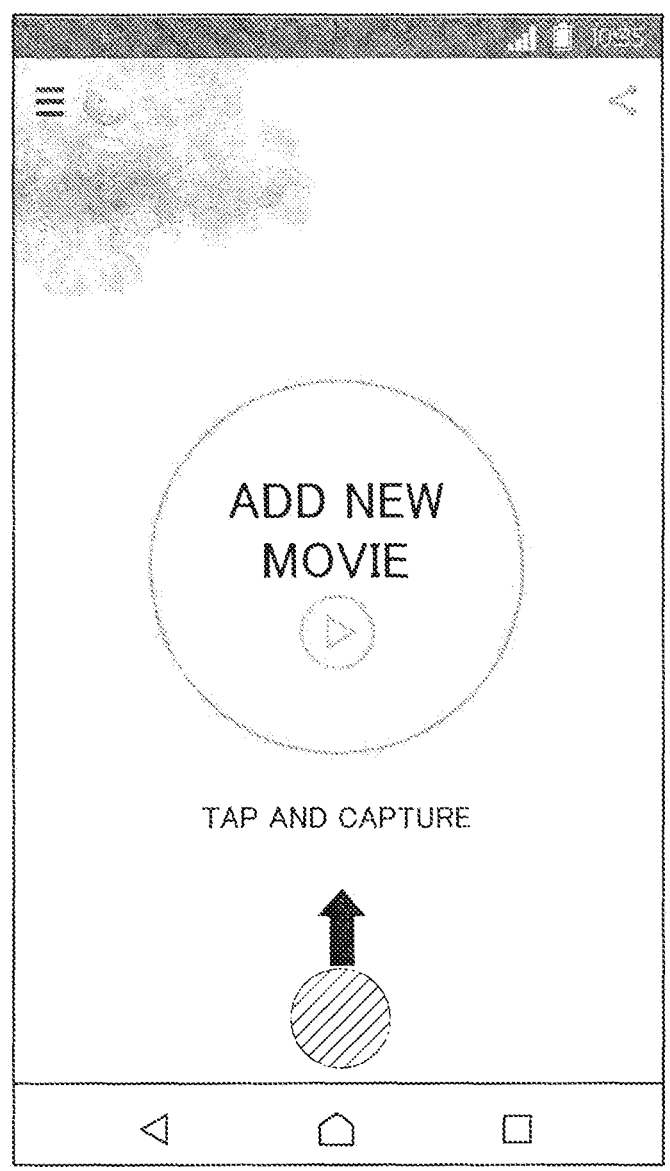
FIG. 25 is an explanatory diagram illustrating an example of the screen displayed on the display unit 210 by the mobile terminal 200.

FIG. 25 is an explanatory diagram illustrating an example of a visual effect that the mobile terminal 200 adds to the list screen. FIG. 25 illustrates an example in which the mobile terminal 200 displays a message for promoting addition of a new moving image to the user in a case where the user scrolls the image to an end of the list screen.

Figure 26:
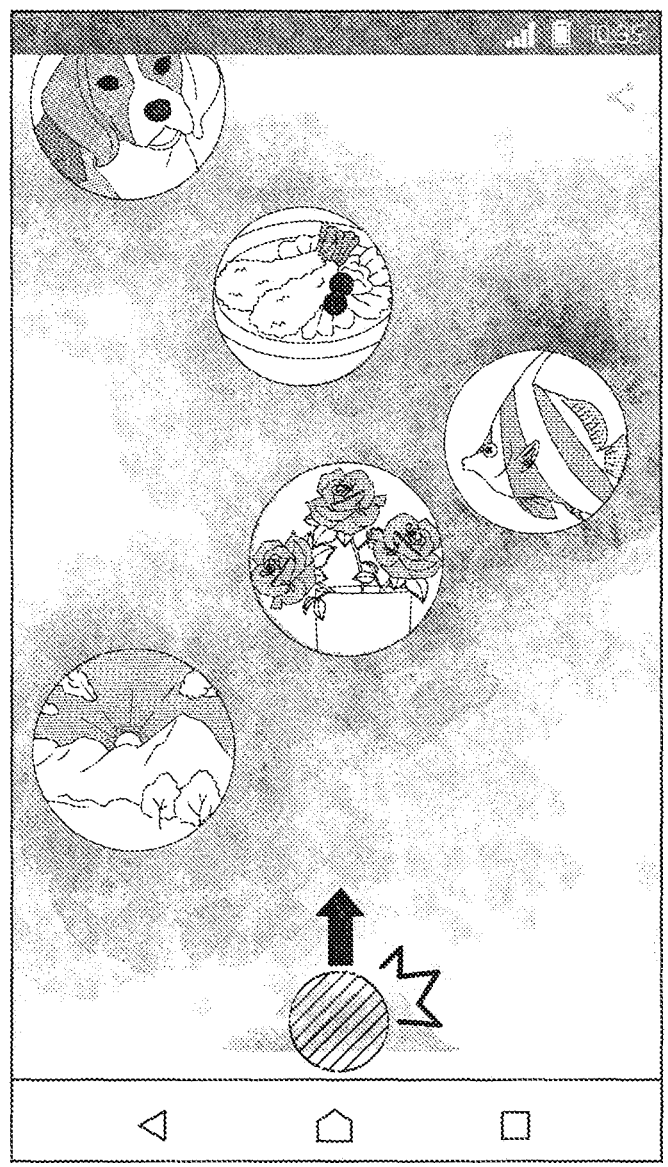
FIG. 26 is an explanatory diagram illustrating an example of the screen displayed on the display unit 210 by the mobile terminal 200.

FIG. 26 is an explanatory diagram illustrating an example of the visual effect that the mobile terminal 200 adds to the list screen. FIG. 25 illustrates an example in which the mobile terminal 200 adds a visual effect to be hung up in a case where the user scrolls to the end of the list screen. In the case where the user scrolls to the end of the list screen as mentioned above, the mobile terminal 200 may add a visual effect that more scroll is not possible because the list screen is hung up to the end, in place of the visual effect that the list screen is bounded.

Figure 27:
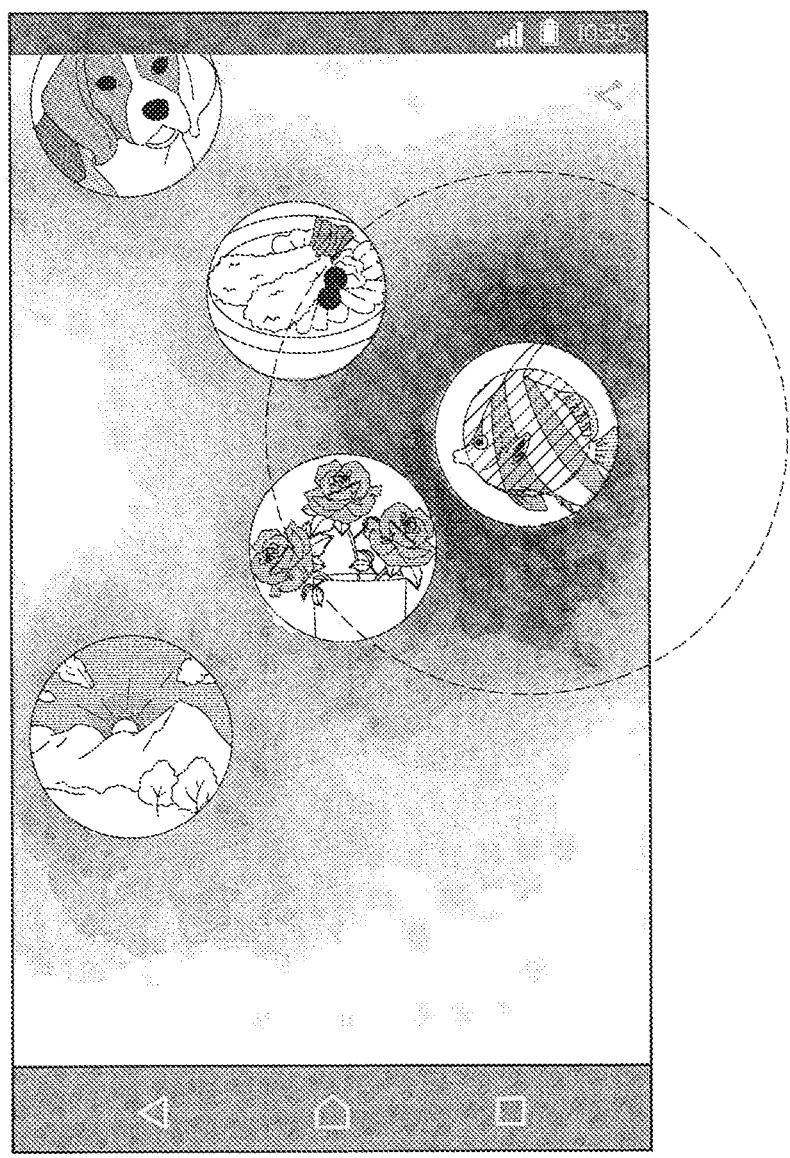
FIG. 27 is an explanatory diagram illustrating an example of the screen displayed on the display unit 210 by the mobile terminal 200.

FIG. 27 is an explanatory diagram illustrating an example of a visual effect that the mobile terminal 200 adds to the list screen. FIG. 27 illustrates an example of a visual effect that the mobile terminal 200 adds in a case where the user long-presses the thumbnail. For example, the user long-presses a thumbnail, and the mobile terminal 200 may widen a blurring range of ink with the long-pressing.

Figure 28:
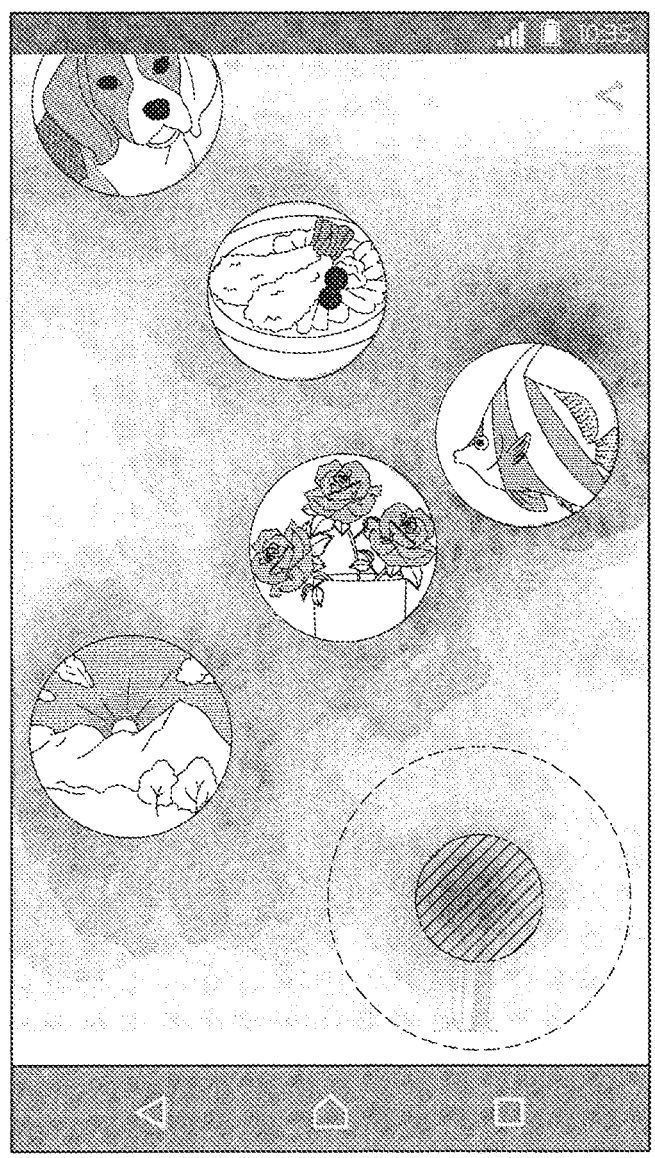
FIG. 28 is an explanatory diagram illustrating an example of the screen displayed on the display unit 210 by the mobile terminal 200.

FIG. 28 is an explanatory diagram illustrating an example of a visual effect added to the list screen by the mobile terminal 200. FIG. 28 illustrates an example of the visual effect added by the mobile terminal 200 in a case where the user long-presses a place that is neither the thumbnail nor the folder. For example, the user long-presses a place that is neither the thumbnail nor the folder, and the mobile terminal 200 may make, blurred, the same color as the ink color of the thumbnail at the near position from the place that the user long-presses depending on the long-pressing.

In addition, the mobile terminal 200 can add various visual effects to the list screen with the operation of the user. For example, the user performs a swiping operation in the right and left in a state in which the mobile terminal 200 displays the list screen, and the mobile terminal 200 may change the number of the thumbnail displayed on the list screen.

2. Conclusion

As mentioned above, according to the embodiment of the present disclosure, it is possible to provide the mobile terminal 200 that can display, with easy view, which moving image is stored on the list screen of the content by adding the visual effect based on the content corresponding to the thumbnail or an analysis result of the content stored in the folder to the thumbnail or folder.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a program which is executed in a computer system in which a single computer or a plurality of computers perform a series of processes, and makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

Further, a part or all of the individual functional blocks illustrated in the functional block diagrams used in the above description may be realized by a server device connected via a network such as the Internet. Furthermore, the configuration of the individual functional blocks illustrated in the functional block diagrams used in the above description may be realized by a single device, or may be realized by a system with cooperation of a plurality of devices. The system with the cooperation of a plurality of devices can include, e.g., combination of a plurality of server devices, combination of the server device and a terminal device, or the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a control unit that determines a visual effect to a screen on which representative information of content is displayed, on a basis of detection information detected at time of generating the content, and allows the determined visual effect to be displayed with the representative information on the screen.

(2)
The information processing device according to (1),
in which the control unit adds a visual effect at least at a periphery of a thumbnail of the content as the representative information of the content.

(3)
The information processing device according to (2),
in which the control unit adds a visual effect at the periphery of the thumbnail of the content depending on substance of the content.

(4)
The information processing device according to (2) or (3),
in which the control unit adds a visual effect at the periphery of the thumbnail of the content depending on a situation in which the content is generated.

(5)
The information processing device according to (4),
in which the control unit adds a visual effect at the periphery of the thumbnail of the content on a basis of a subject included in the content.

(6)
The information processing device according to (4) or (5),
in which the control unit adds a visual effect at the periphery of the thumbnail of the content on a basis of information about a generating place of the content.

(7)
The information processing device according to any one of (4) to (6),
in which the control unit adds a visual effect at the periphery of the thumbnail of the content on a basis of a state of a user who generates the content.

(8)
The information processing device according to any one of (4) to (7),
in which the control unit adds a visual effect at the periphery of the thumbnail of the content on a basis of biological information of a user detected at timing corresponding to timing of generating the content.

(9)
The information processing device according to any one of (4) to (8),
in which the control unit adds a visual effect at the periphery of the thumbnail of the content on a basis of information about a behavior state of a user, detected at timing corresponding to timing of generating the content.

(10)
The information processing device according to any one of (1) to (9),
in which the control unit adds a visual effect to at least inside of inclusive content that includes one or more pieces of content, as the representative information of the content.

(11)
The information processing device according to (10),
in which the control unit changes a visual effect depending on substance of the content included in the inclusive content.

(12)
The information processing device according to (10) or (11),
in which the control unit changes a visual effect depending on a number of pieces of content included in the inclusive content.

(13)
The information processing device according to any one of (1) to (10),
in which the control unit allows a predetermined color to be displayed around the representative information of the content, as the visual effect.

(14)
The information processing device according to (13),
in which the control unit changes display of the predetermined color depending on substance of the content.

(15)
The information processing device according to (13),
in which the control unit changes the predetermined color depending on an amount of motion of the content.

(16)
The information processing device according to any one of (11) to (13),
in which the control unit changes a dyeing color depending on substance of the content.

(17)

The information processing device according to (11), in which when the content is reproduced in the representative information of the content, the control unit changes the predetermined color depending on the reproduction.

(18)

The information processing device according to any one of (1) to (17), in which the control unit adds the visual effect to the representative information in a case where an operation of a user to the representative information is performed.

(19)

An information processing method including:

determining a visual effect to a screen on which representative information of content is displayed, on a basis of detection information that is detected at time of generating the content; and allowing the determined visual effect to be displayed with the representative information on the screen.

(20)

A computer program allowing a computer system to execute:

determining a visual effect to a screen on which representative information of content is displayed, on a basis of detection information that is detected at time of generating the content; and allowing the determined visual effect to be displayed with the representative information on the screen.

REFERENCE SIGNS LIST 100 imaging device
101 hole
110 imaging unit
120 eye touch detecting unit
130 output unit
140 sensor unit
150 storing unit
160 communication unit
170 operating unit
180 control unit
200 mobile terminal
210 display unit
220 output unit
230 storing unit
240 communication unit
250 operating unit
260 control unit
d1 icon
t1 thumbnail
t2 thumbnail
t3 thumbnail
s11 blur

The invention claimed is:

1. An information processing device, comprising:
a control unit configured to:
obtain detection information detected at a time of generation of content;
determine a visual effect for addition of the visual effect to a screen on which representative information of the content is displayed, wherein
the visual effect is determined based on the detection information, and
the visual effect represents a field of view of a user;
control the screen to display the determined visual effect along with the representative information on the screen; and
change a blurring speed of the displayed visual effect based on a speed of a moving subject in the content, wherein the moving subject corresponds to the representative information of the content.

2. The information processing device according to claim 1, wherein
the control unit is further configured to add the visual effect at least at a periphery of a thumbnail of the content, and
the thumbnail of the content is the representative information of the content.

3. The information processing device according to claim 2, wherein the control unit is further configured to add the visual effect at the periphery of the thumbnail of the content based on substance of the content.

4. The information processing device according to claim 2, wherein the control unit is further configured to add the visual effect at the periphery of the thumbnail of the content based on a situation in which the content is generated.

5. The information processing device according to claim 4, wherein the control unit is further configured to add the visual effect at the periphery of the thumbnail of the content based on the moving subject in the content.

6. The information processing device according to claim 4, wherein the control unit is further configured to add the visual effect at the periphery of the thumbnail of the content based on information associated with a place of the generation of the content.

7. The information processing device according to claim 4, wherein the control unit is further configured to add the visual effect at the periphery of the thumbnail of the content based on a state of the user.

8. The information processing device according to claim 4, wherein the control unit is further configured to:
obtain biological information of the user, wherein the biological information is detected at the time of the generation of the content; and
add the visual effect at the periphery of the thumbnail of the content based on the obtained biological information.

9. The information processing device according to claim 4, wherein
the control unit is further configured to add the visual effect at the periphery of the thumbnail of the content based on information of a behavior state of the user, and
the behavior state is detected at the time of the generation of the content.

10. The information processing device according to claim 1, wherein
the control unit is further configured to add the visual effect to at least inside of inclusive content, and
the inclusive content includes at least one piece of the content as the representative information of the content.

11. The information processing device according to claim 10, wherein the control unit is further configured to change the visual effect based on substance of the at least one piece of the content in the inclusive content.

12. The information processing device according to claim 10, wherein the control unit is further configured to change the visual effect based on a number of pieces of the content in the inclusive content.

13. The information processing device according to claim 1, wherein
the control unit is further configured to control display of a specific color around the representative information of the content, and the specific color displayed around the representative information of the content is the visual effect.

14. The information processing device according to claim 13, wherein the control unit is further configured to change the display of the specific color based on substance of the content.

15. The information processing device according to claim 14, wherein the control unit is further configured to change the display of the specific color based on an amount of motion of the content.

16. The information processing device according to claim 13, wherein the control unit is further configured to change the specific color based on substance of the content.

17. The information processing device according to claim 13, wherein the control unit is further configured to change the specific color based on reproduction of the content.

18. The information processing device according to claim 1, wherein the control unit is further configured to add the visual effect to the representative information based on a user operation on the representative information.

19. An information processing method, comprising:
obtaining detection information detected at a time of generation of content;
determining a visual effect for addition of the visual effect to a screen on which representative information of the content is displayed, wherein
the visual effect is determined based on the detection information, and
the visual effect represents a field of view of a user;
controlling the screen to display the determined visual effect along with the representative information; and
changing a blurring speed of the displayed visual effect based on a speed of a moving subject in the content, wherein the moving subject corresponds to the representative information of the content.

20. A non-transitory computer-readable medium having stored thereon, computer-executable instructions which, when executed by a computer, cause the computer to execute operations, the operations comprising:
obtaining detection information detected at a time of generation of content;
determining a visual effect for addition of the visual effect to a screen on which representative information of the content is displayed, wherein
the visual effect is determined based on the detection information, and
the visual effect represents a field of view of a user;
controlling the screen to display the determined visual effect along with the representative information; and
changing a blurring speed of the displayed visual effect based on a speed of a moving subject in the content, wherein the moving subject corresponds to the representative information of the content.

* * * * *